US012712303B2

(12) United States Patent
Rosan et al.

(10) Patent No.: US 12,712,303 B2
(45) Date of Patent: Aug. 18, 2026

(54) ELECTRICAL CIRCUIT BOARD-PLUG CONTACT DEVICE

(71) Applicant: TE Connectivity Germany GmbH, Bensheim (DE)

(72) Inventors: Daniel Rosan, Bensheim (DE); Willi Dietrich, Bensheim (DE); Rajesh Kumar, Bensheim (DE); Stefan Masak, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 633 days.

(21) Appl. No.: 18/163,342

(22) Filed: Feb. 2, 2023

(65) Prior Publication Data

US 2023/0253725 A1 Aug. 10, 2023

(30) Foreign Application Priority Data

Feb. 4, 2022 (DE) ......................... 102022102656.6

(51) Int. Cl.
*H01R 13/11* (2006.01)
*H01R 12/58* (2011.01)
(Continued)

(52) U.S. Cl.
CPC ......... *H01R 13/112* (2013.01); *H01R 12/585* (2013.01); *H01R 13/15* (2013.01); *H01R 43/24* (2013.01)

(58) Field of Classification Search
CPC .... H01R 13/112; H01R 12/585; H01R 13/15; H01R 43/24; H01R 13/2407;
(Continued)

(56) References Cited

U.S. PATENT DOCUMENTS 5,954,529 A 9/1999 Meller
6,155,887 A * 12/2000 Cuff ..................... H01R 12/523
439/84

(Continued)

FOREIGN PATENT DOCUMENTS

DE 102004050715 B3 3/2006
EP 0848455 A2 1/1995

(Continued)

OTHER PUBLICATIONS

Extended European Search Report dated Jun. 14, 2023, corresponding to Application No. 23154505.4-1201, 21 pages.

(Continued)

*Primary Examiner* — Truc T Nguyen
(74) *Attorney, Agent, or Firm* — Barley Snyder

(57) ABSTRACT

An electrical contact device includes a first electrical contact portion mechanically fixing and electrically connecting the electrical contact device to a circuit board by press-fitting, a second electrical contact portion forming an electrical plug contact matable with an electrical mating contact element, and a spring portion arranged between the first and second electrical contact portions in a longitudinal direction of the electrical contact device. The second electrical contact portion has a fork structure with a pair of fork elements mechanically clamping and fixing the electrical mating contact element on the electrical contact device. The spring portion electrically connects the first and second contact portions. The spring portion permits an elastic variation of a spacing between the first and second electrical contact portions in the longitudinal direction.

22 Claims, 17 Drawing Sheets

(51) Int. Cl.

*H01R 13/15* (2006.01)

*H01R 43/24* (2006.01)

(58) Field of Classification Search

CPC ................ H01R 2201/26; H01R 12/91; H01R 12/7088; H01R 13/113; H01R 13/2414; H01R 12/58; H01R 12/718; H01R 13/11; H01R 12/7064; H01R 12/71

See application file for complete search history.

(56) References Cited

U.S. PATENT DOCUMENTS

| | | | | |
|---|---|---|---|---|
| 6,716,073 | B1 * | 4/2004 | Lee | H01R 13/04 439/885 |
| 6,794,890 | B1 | 9/2004 | Tokumo et al. | |
| 10,096,920 | B2 * | 10/2018 | Lee | H01R 12/722 |
| 2005/0272298 | A1 * | 12/2005 | Miyoshi | H01R 12/675 439/395 |
| 2009/0197439 | A1 | 8/2009 | Nabilek | |
| 2010/0255692 | A1 | 10/2010 | Bott et al. | |
| 2010/0285686 | A1 * | 11/2010 | Lang | H01R 13/6315 439/404 |
| 2012/0080626 | A1 * | 4/2012 | Fuerst | B60T 8/3675 251/129.15 |
| 2013/0157519 | A1 * | 6/2013 | Ohkuma | H01R 12/732 439/780 |
| 2020/0239666 | A1 * | 7/2020 | Hellinger et al. | H01R 12/585 |
| 2021/0234290 | A1 * | 7/2021 | Dunham | H01R 12/52 |
| 2022/0231569 | A1 | 7/2022 | Hellinger et al. | |
| 2023/0013728 | A1 * | 1/2023 | Brungard | H01R 12/7088 |
| 2023/0420874 | A1 * | 12/2023 | Dunham | H01R 12/52 |

FOREIGN PATENT DOCUMENTS

| | | | |
|---|---|---|---|
| JP | H9167667 | A | 6/1997 |
| JP | 2001102141 | A | 4/2001 |
| JP | 2004138391 | A | 5/2004 |
| JP | 2006266869 | A | 10/2006 |
| JP | 201615273 | A | 1/2016 |
| JP | 2020202012 | A | 12/2020 |
| KR | 1020220011738 | A | 1/2022 |
| WO | 2020239666 | A1 | 12/2020 |

OTHER PUBLICATIONS

Indian Office Action dated Sep. 2, 2024, corresponding to Application No. 202344006515, 6 pages.

Japanese Office Action dated Sep. 10, 2024 with English translation, corresponding to Application No. 2023-013718, 12 pages.

Korean Office Action dated Oct. 20, 2025 with English translation, corresponding to Application No. 10-2023-0014857, 19 pages.

German Office Action, Application No. 10 2022 102 656.6, Dated: Sep. 14, 2022, 5 pages.

* cited by examiner

ELECTRICAL CIRCUIT BOARD-PLUG CONTACT DEVICE

CROSS-REFERENCE TO RELATED APPLICATIONS

This application claims the benefit of the filing date under 35 U.S.C. § 119(a)-(d) of German Patent Application No. 102022102656.6, filed on Feb. 4, 2022.

FIELD OF THE INVENTION

The invention relates to an electrical circuit board-plug contact device for an electrical circuit board of an electrical contact system.

BACKGROUND

In the electrical sector (electronics, electrotechnology, electricity, electrical energy technology, etc.) a large number of electrical connector devices, socket connectors, pin connectors and/or hybrid connectors, etc. are known—hereinafter denoted as (electrical) connectors (also mating connectors)—which serve to transmit electrical currents, voltages, signals and/or data with a large range of currents, voltages, frequencies and/or data rates in the low, medium or high voltage range and/or low, medium or high current range. In particular in the automotive sector, such connectors must ensure a rapid transmission of electrical power, signals and/or data permanently, repeatedly and/or after a relatively long time of inactivity in mechanically stressed, warm, potentially hot, contaminated, damp and/or chemically aggressive environments. Due to the wide range of applications, a large number of specifically designed connectors is known.

In particular, when used in the automotive industry, such connector devices or contact devices are subjected to significant vibrations. Such vibrations can cause movements of the mating contact devices, which are connected to the contact devices and which are configured, for example, as contact materials, tabs or busbars, relative to the contact devices. These movements can lead to friction between the contact devices and the mating contact devices. This friction can in turn impair the electrical contact and lead to wear of the components rubbing against one another. Moreover, a displacement of the contact devices and the mating contact devices relative to one another can take place as a result of a heating/cooling of the components. This can in turn lead to an impairment of the contact and to signs of wear of the contact devices and the mating contact devices which rub against one another.

SUMMARY

An electrical contact device includes a first electrical contact portion mechanically fixing and electrically connecting the electrical contact device to a circuit board by press-fitting, a second electrical contact portion forming an electrical plug contact matable with an electrical mating contact element, and a spring portion arranged between the first and second electrical contact portions in a longitudinal direction of the electrical contact device. The second electrical contact portion has a fork structure with a pair of fork elements mechanically clamping and fixing the electrical mating contact element on the electrical contact device. The spring portion electrically connects the first and second contact portions. The spring portion permits an elastic variation of a spacing between the first and second electrical contact portions in the longitudinal direction.

BRIEF DESCRIPTION OF THE DRAWINGS

Exemplary embodiments of the invention are described by way of the following drawings. In the drawings.

DETAILED DESCRIPTION OF THE EMBODIMENT(S)

Figure 1:
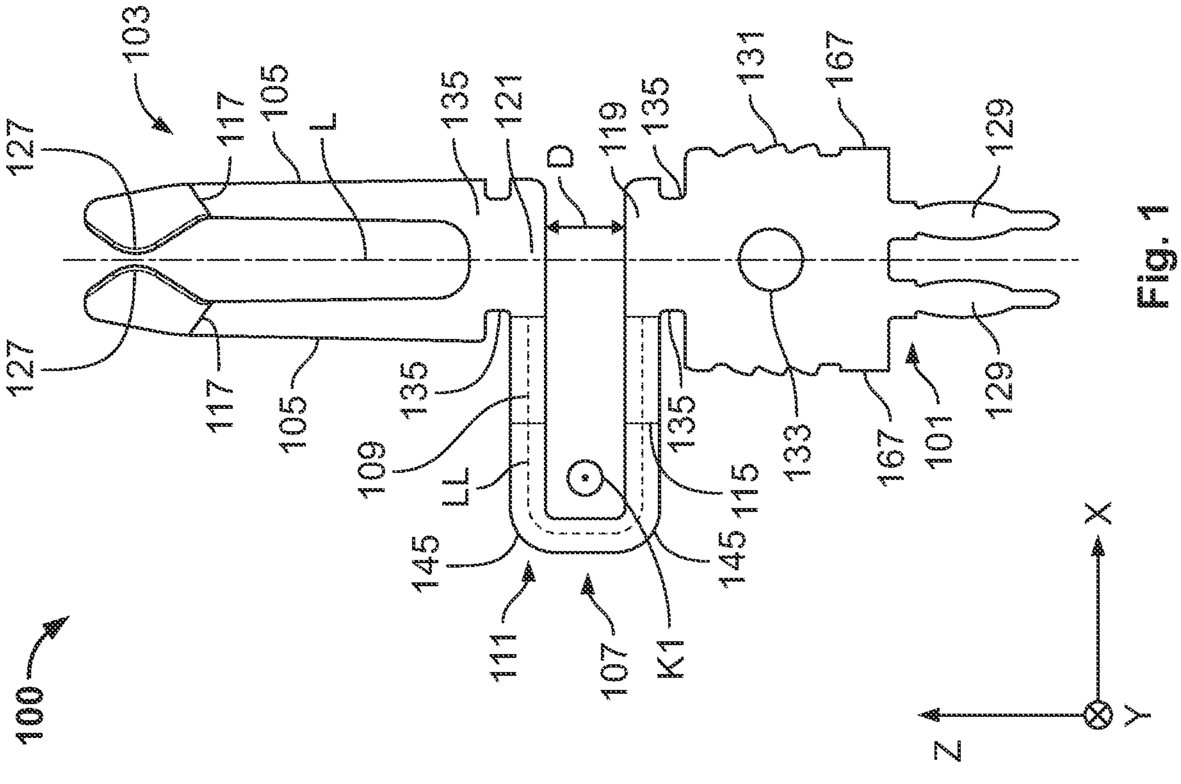
FIG. 1 shows a schematic view of an electrical circuit board-plug contact device according to an embodiment.

FIG. 1 shows a schematic view of an electrical circuit board-plug contact device 100 according to an embodiment. The electrical board-plug contact device 100 may also be referred to as an electrical contact device 100 or just a contact device 100 throughout the specification.

In the embodiment shown, the electrical circuit board-plug contact device 100 according to the invention comprises a first contact portion 101 for the mechanical fixing and electrical contact of the plug contact device 100 to a circuit board. The fixing can be brought about in this case via the first contact portion 101 by a press-fit fixing. The first contact portion 101 has at least one press-fit pin 129, the plug contact device 100 being able to be fixed thereby via a press-fit fixing to the circuit board. In the embodiment shown, the first contact portion 101 comprises two press-fit pins 129. This is not intended to limit the invention, however. The first contact portion 101 also comprises latching teeth 131 on opposing edges 167.

An additional fixing of the plug contact device 100 in a possible housing can be achieved by the latching teeth 131. The first contact portion 101 also comprises a fixing opening 133. By the fixing opening 133, for example via a latching connection, a fixing of the plug contact device 100 in the aforementioned housing can also be achieved. The plug housing can be configured such that the plug housing is latchable or latched to the circuit board-contact device 100. Moreover, the device 100 can be latchable or latched in the plug housing. Moreover, the plug housing can be supported on the circuit board. The plug housing can comprise a lead-in bevel for the mating contact means on/in the mating face.

The plug contact device 100, as shown in FIG. 1, also comprises a second contact portion 103. Plugging contact with a mating contact element is possible by the second contact portion 103. According to the invention, the second contact portion 103 comprises a fork structure with two opposing fork elements 105. The fork elements 105 are elastically deformable relative to one another and configured to fix a mating contact element inserted between the fork elements 105. The fork elements 105 can be configured, in particular, to exert a compressive force of 10 N on a mating contact element inserted in the fork structure. In particular, the fork structure is configured to exert on the mating contact element a compressive force which is configured to generate friction between the contact points of the fork structure and the mating contact element, which is suitable for avoiding a longitudinal movement of the mating contact element. For fixing the mating contact element, the fork elements 105 comprise contact projections 127, a mechanical and electrical contact of the mating contact element inserted into the fork structure being made possible thereby. The fork elements 105 are configured in each case as bar elements and comprise in relation to a longitudinal direction L of the plug contact device 100 a minimum width 117 of the fork elements 105. The width in this case describes an expansion of the fork element 105 in a direction at least partially perpendicular to the longitudinal axis L.

According to the invention, the plug contact device 100 also comprises a spring portion 107 which is arranged between the first and second contact portions 101, 103 as shown in FIG. 1. In the embodiment shown, the spring portion 107 comprises a curved element 109. The curved element 109 comprises a first curved portion 111. In the first curved portion 111, the curved element 109 comprises a curvature running relative to a first axis of curvature K1. In the embodiment shown, the curved element 109 comprises a curve of 180° in the first curved portion 111. To this end, the curved element 109 comprises two angled elements 145. The angled elements 145 in the embodiment shown are in each case 90°-angled elements. In the embodiment shown, in each case the first axis of curvature K1 is arranged at right-angles to the longitudinal axis L of the plug contact device 100. In the embodiment shown, the longitudinal axis L thus runs parallel to the z-axis of the coordinate system shown, while the first axis of curvature K1 is oriented parallel to the y-axis of the coordinate system shown. The curved element 109 is elastically deformable along the longitudinal axis L of the plug contact device 100 via the curvature of the curved element 109 in the first curved portion 111. A variation of a spacing D is possible between the first and second contact portions 101, 103 by the elastic deformation of the curved element 109. A spacing D between the first and second contact portions 101, 103 can be achieved by the action of a compressive force, which is oriented in the direction of the first contact portion 101, onto the second contact portion 103 or by the action of a tensile force, which faces away from the first contact portion, onto the second contact portion 103, and thus by an elastic deformation of the curved element 109. The curved element 109 in this case acts in a comparable manner to an elastically deflected spring structure. It is possible to compensate for vibrations of the plug contact device 100, and in particular of the circuit board and of the mating contact elements in contact via the plug contact by the function of the curved element 109, and associated therewith the variation of the spacing of the first and second contact portions 101, 103 to one another.

By avoiding the movement of the mating contact element inside the electrical contact portion, it is possible to avoid a friction between the mating contact element and the fork elements 105 of the fork structure of the contact portion. A movement of the mating contact element inside the electrical contact portion could, however, lead to an impairment of the electrical contact and to increased wear both of the fork elements 105 of the fork structure of the contact portion of the plug contact device and of the mating contact element. Both can be avoided by the spring portion 107. The spring portion of the plug contact device 100 thus permits an improved contact of the mating contact element with the plug contact device 100 and permits a reduction of the effects of wear and associated therewith an improvement of the service life of the plug contact device. The circuit board-plug contact device can also be used for high voltage applications.

In the embodiment shown in FIG. 1, the spacing D runs between the first and second contact portions 101, 103 between a first base portion 119 and a second base portion 121 of the spring portion 107. According to the invention, the first base portion 119 is connected to the first contact portion 101, while the second base portion 121 is connected to the second contact portion 103. In the embodiment shown, recesses 135 are also arranged on the first base portion 119 and on the second base portion 121. The elastic deformability of the curved element 109 of the spring portion 107 along the longitudinal axis L can be further increased by the recesses 135, so that a more sensitive response behavior of the curved element 109 to occurring vibrations is possible. The spring portion 107 makes it possible to provide a simplified structure of the spring portion 107 which can bring about a variation of the spacing. In the embodiment shown, the first and second contact portions 101, 103 are arranged on a line relative to the longitudinal axis L. According to one embodiment, the first and second contact portions 101, 103 are arranged laterally offset to one another relative to the longitudinal axis L.

As an alternative to the embodiment shown, in which the first curved portion 111 is generated via the two angled elements 145 at right-angles, the first curved portions 111 can also be shaped in a circular configuration.

In the embodiment shown in FIG. 1, the curved element 109 is configured as a bar element and comprises a width 115. The width 115 in this case is greater than or equal to the minimum width 117 of the fork elements 105. The width 117 of the bar element in this case describes an extension of the curved element 109 in a direction perpendicular to the longitudinal direction LL of the curved element 109.

The entire current transmission runs in the plug contact device 100 via the fork elements 105 of the first contact portion 101, through the curved element 109 of the spring portion 107 and via the first contact portion 101. Since the curved element 109 is configured to be as wide as or wider than the narrowest point of the fork elements 105, this narrowest point of the fork elements 105 functions as a bottleneck for the conductivity of the plug contact device 100. Due to the curved element 109 of the spring portion 107, the conductivity or the resistance and associated therewith the heat development in the plug contact device 100 are not negatively influenced further.

According to one embodiment, the plug contact device 100 is configured as a metal sheet with a thickness of, for example, 0.6 mm. The material of the metal sheet can, for example, be a copper composite, for example a copper-nickel-silicon composite. The plug contact device according to the invention 100 thus can be manufactured, for example, by a stamping process, the contours of the plug contact device 100 shown in FIG. 1 being able to be generated thereby.

Figure 2:
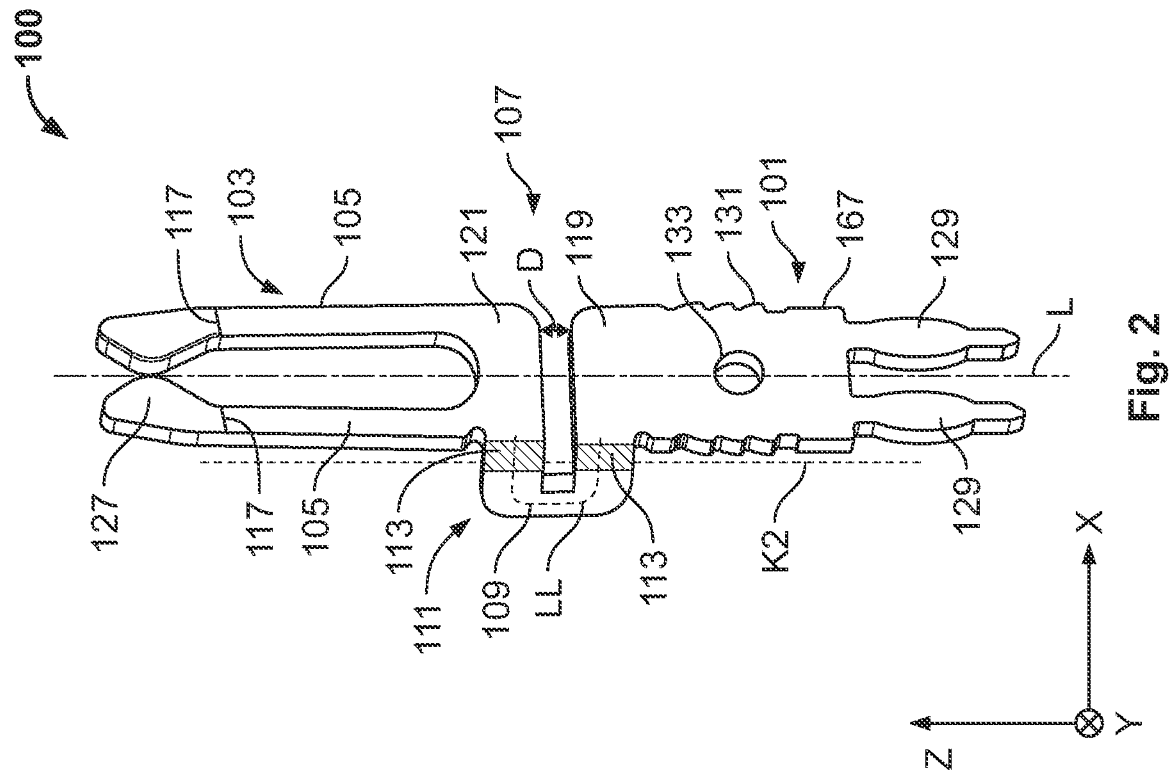
FIG. 2 shows a further schematic view of an electrical circuit board-plug contact device according to a further embodiment.

FIG. 2 shows a further schematic view of an electrical circuit board-plug contact device 100 according to a further embodiment. The embodiment shown in FIG. 2 is based on the embodiment in FIG. 1 and comprises most of the features shown therein. A further detailed description is omitted hereinafter. The embodiment shown in FIG. 2 differs from the embodiment in FIG. 1 by a second curved portion 113 of the curved element 109. In the second curved portion 113, the curved element 109 comprises, in addition to the first curved portion 111, a curvature about a second axis of curvature K2 running parallel to the longitudinal axis L. In the embodiment shown, the curved element 109 in the second curved portion 113 comprises a curvature of 90°.

The smallest possible installation space of the plug contact device 100 can be achieved via the second curved portion 113. Due to the curvature of the curved element 109 about the second axis of curvature K2, the width of the plug contact device 100 can be reduced to a minimum width and thus the required installation space of the plug contact device 100 can also be reduced.

Figure 3:
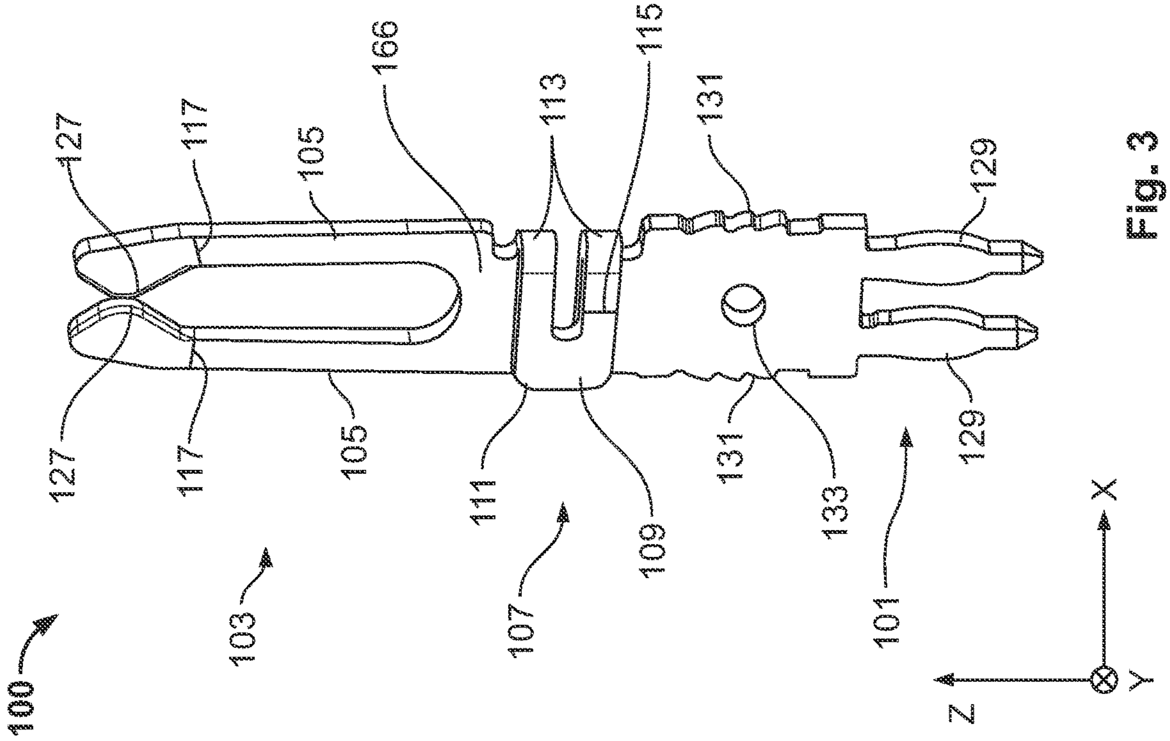
FIG. 3 shows a further schematic view of an electrical circuit board-plug contact device according to a further embodiment.

FIG. 3 shows a further schematic view of an electrical circuit board-plug contact device 100 according to a further embodiment. The embodiment in FIG. 3 is based on the embodiment in FIG. 2 and comprises the features shown therein. A further detailed description is therefore omitted. The embodiment in FIG. 3 differs from the embodiment in FIG. 2 by a 180° curvature of the curved element 109 in the second curved portion 113. The curved element 109 is thus curved onto a rear face 166 of the plug contact device 100 so that an orientation of the curved element 109 runs parallel to the surface orientation of the rear face 166 of the plug contact device 100.

Due to the 180° curvature about the first or second axis of curvature K1, K2 in the first or second curved portions 111, 113 the required installation space of the plug contact device 100 can be reduced in turn. Moreover, a nesting of a plurality of plug contact devices 100 in one another is possible, whereby the installation space required for a plurality of plug contact devices can be reduced in turn.

Figure 4:
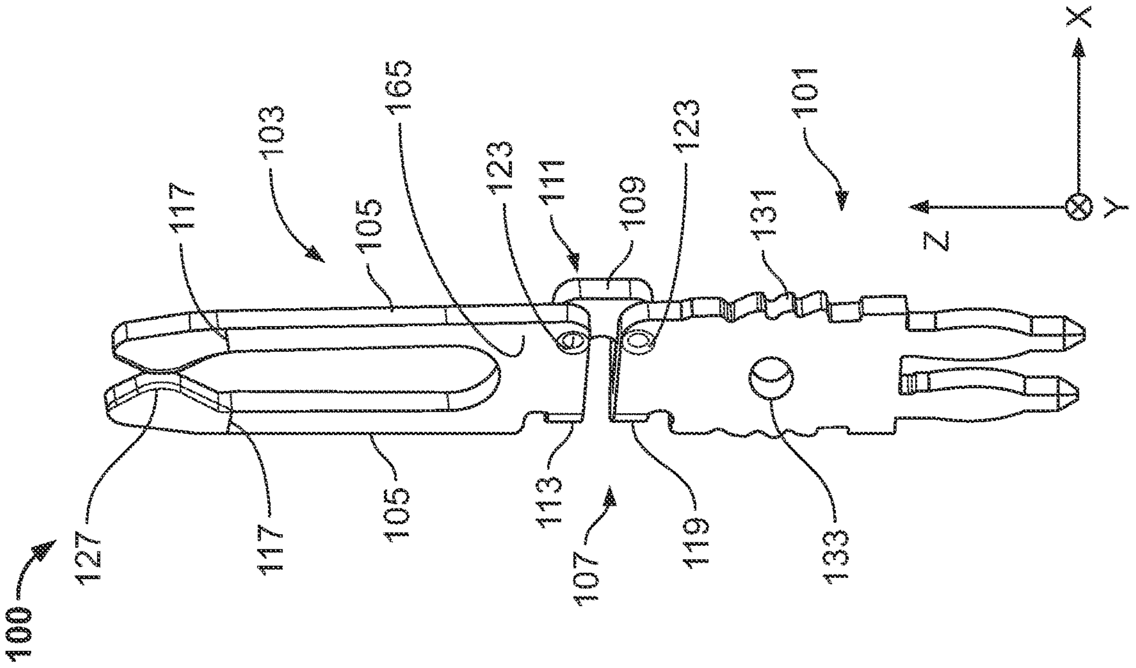
FIG. 4 shows a further schematic view of an electrical circuit board-plug contact device according to a further embodiment.

FIG. 4 shows a further schematic view of an electrical circuit board-plug contact device 100 according to a further embodiment. The embodiment shown in FIG. 4 is based on the embodiment in FIG. 3. FIG. 4 shows in this case a view of the front face 165 of the plug contact device 100. In the embodiment shown, in each case the first and second base portions 119, 121 comprise a contact element 123. The contact elements 123 protrude from the first and second base portions 119, 121. A contact of the first and second base portions 119, 121 with the first curved portion 111 of the curved element 109 is possible via the contact elements 123. Due to the 180° curvature of the curved element 109 in the second curved portion 113, the orientation of the curved element 109 runs parallel to the surface of the base portions 119, 121 or the plug contact device 100. According to the invention, a current path of an electrical current inside the plug contact device 100 runs between the first and second contact portions 101, 103, through the curved element 109 of the spring portion 107. Via the contact elements 123, a short current path is possible between the first and second base portions 119, 121, through the first curved portion 111 of the curved element 109.

The current path of the electrical current running between the first and second contact portions 101, 103 thus does not have to run entirely through the curved element 109 but a shorter current path is possible between the first and second base portions 119, 121 via the contact of the contact elements 123 and the first curved portion 111 of the curved element 109. As a result, the conductivity or the contact capacity of the plug contact device 100 can be increased in turn. Since the spring portion 107 also contributes to the electrical conductivity of the plug contact device 100, in addition to the elastic deformability and the variation of the spacing, the components required for the plug contact device 100 can be reduced to a minimum, whereby the structure of the plug contact device 100 can be kept as simple as possible. The contact elements 123 can be generated, for example, by a stamping process as stamped raised portions.

Figure 5:
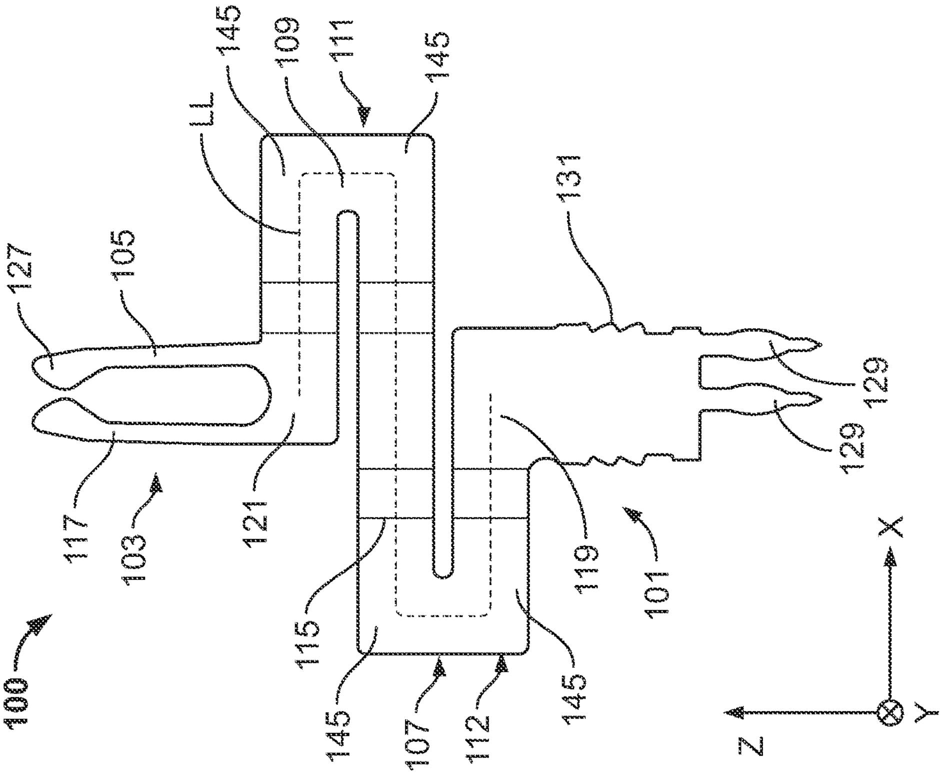
FIG. 5 shows a further schematic view of an electrical circuit board-plug contact device according to a further embodiment.

FIG. 5 shows a further schematic view of an electrical circuit board-plug contact device 100 according to a further embodiment. The embodiment in FIG. 5 is based on the embodiment in FIG. 1. Deviating from the embodiment in FIG. 1, the curved element 109 comprises two first curved portions 111, 112. In the two first curved portions 111, 112 the curved element 109 in each case comprises curvatures relative to the first axis of curvature K1. In the two first curved portions 111, 112 the curved element 109 in each case comprises curvatures of an opposing direction of curvature about the first axis of curvature K1. Thus, starting from the first contact portion 101 in the direction of the second contact portion 103, the curved element 109 in the further first curved portion 112 comprises a clockwise curvature while the curved element 109 in the first curved portion 111 comprises a counterclockwise curvature. In the embodiment shown, the first and second contact portions 101, 103 are also arranged on a line relative to the longitudinal axis L. The two first curved portions 111, 112 provide uniform variation of the spacing between the first and second contact portions 101, 103 by the elastic deformability of the curved element 109, without the first and second contact portions 101, 103 being tilted by the elastic deformation of the curved element 109.

Figure 6:
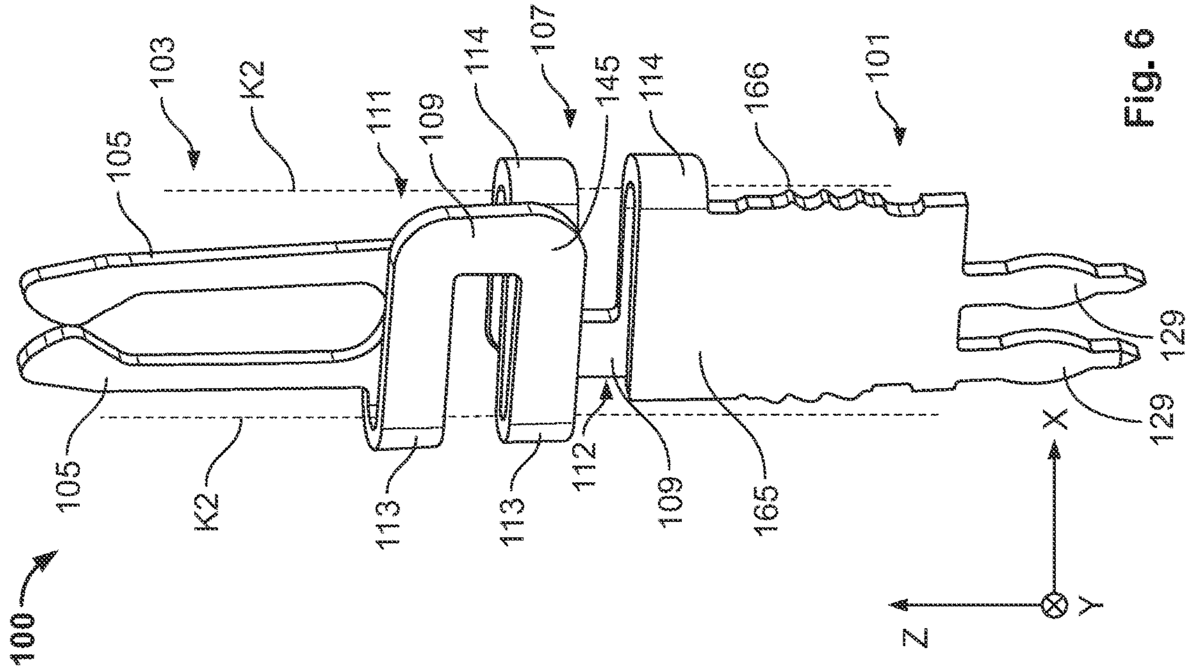
FIG. 6 shows a further schematic view of an electrical circuit board-plug contact device according to a further embodiment.

FIG. 6 shows a further schematic view of an electrical circuit board-plug contact device 100 according to a further embodiment. The embodiment shown is based on the embodiment in FIG. 5. In the embodiment shown in FIG. 6, the curved element 109 comprises a second curved portion 113 and a further second curved portion 114. In the embodiment shown, the curved element 109 is curved by 180° about the second axis of curvature K2 running parallel to the longitudinal axis L. In this case, the curved element 109 comprises curvatures in opposing directions of curvature in the two second curved portions 113, 114. This results in the two first curved portions 111, 112 of the curved element 109 being arranged on different sides of the plug contact device 100, by the opposing curvature in the two second curved portions 113, 114 about the second axis of curvature K2. Thus the first curved portion 111 in the orientation shown is arranged on the front face 165 of the plug contact device 100, while the further first curved portion 112 is arranged on the rear face 166 of the plug contact device 100.

Figure 7:
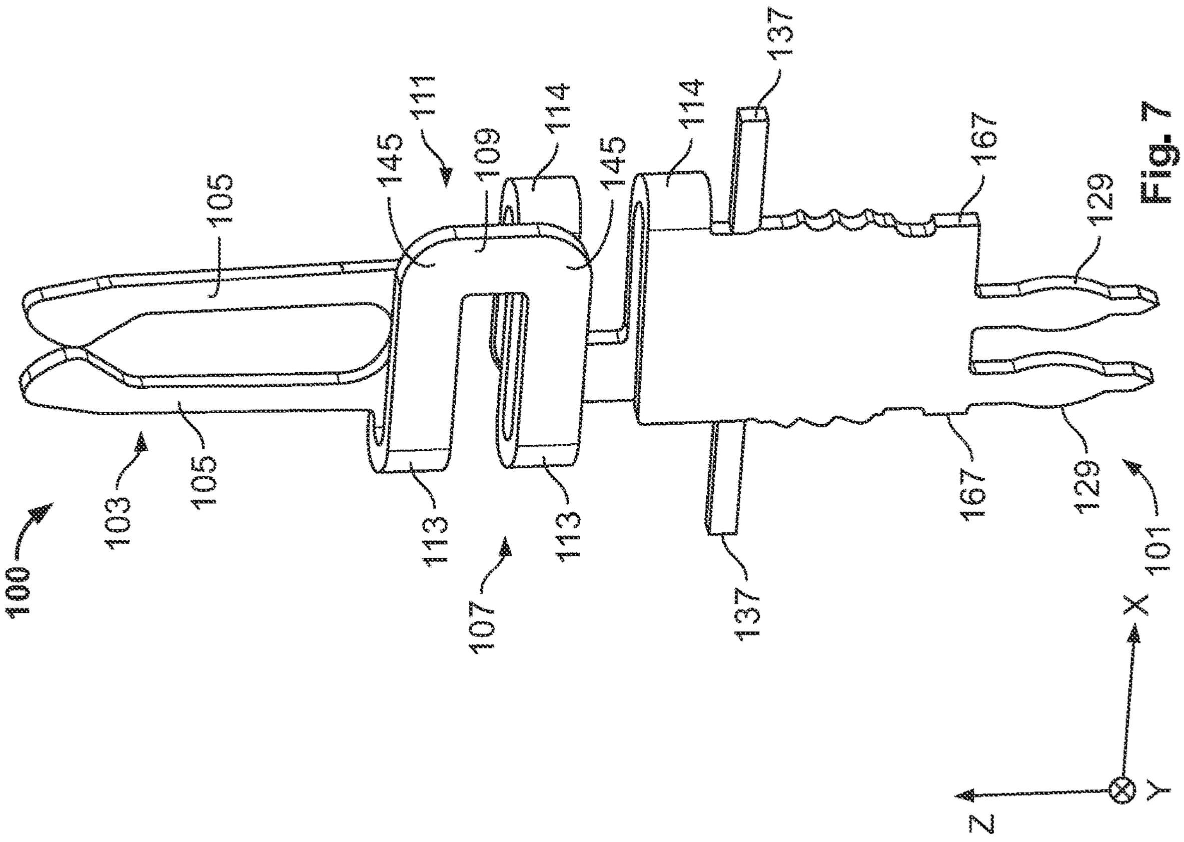
FIG. 7 shows a further schematic view of an electrical circuit board-plug contact device according to a further embodiment.

FIG. 7 shows a further schematic view of an electrical circuit board-plug contact device 100 according to a further embodiment. The embodiment shown is based on the embodiment in FIG. 6. Deviating from the embodiment in FIG. 6, the plug contact device 100 in FIG. 7 comprises holding projections 137 which are configured on two opposing edges 167 and which extend to the side on both sides of the plug contact device 100. A fixing of the plug contact device 100 in a housing can be achieved via the holding projections 137.

Figure 8:
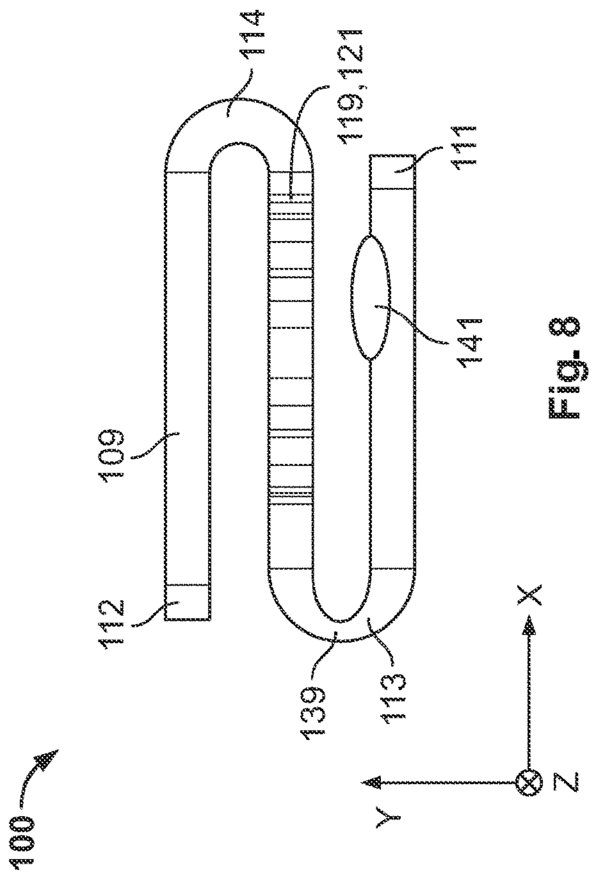
FIG. 8 shows a further schematic view of an electrical circuit board-plug contact device according to a further embodiment.

FIG. 8 shows a further schematic view of an electrical circuit board-plug contact device 100 according to a further embodiment. The embodiment shown is based on the embodiment in FIG. 7. In FIG. 8, a plan view is shown along the longitudinal axis L of the plug contact device 100 and correspondingly along the z-axis of the coordinate systems. In the plan view shown, the S-shape of the curved element 109 is illustrated, in which the curved element 109 in the two second curved portions 113, 114 is curved in each case in an opposing direction of curvature. In the embodiment shown, the curved element 109 comprises a tapered portion 139 in the second curved portion 113. In the tapered portion 139 a thickness of the metal sheet of the plug contact device 100 is reduced. Moreover, the curved element 109 in the first curved portion 111 comprises a contact raised portion 141. In the view shown, the contact raised portion 141 is shown without contact with the first curved portion 111. This is only for reasons of illustration. In a real configuration, a contact might be achieved. A contact of the first curved portion 111 of the curved element 109 with a base portion 119, 121 of the spring portion 107 is possible via the contact raised portion 141. The contact of the first curved portion 111 with the base portion 191, 121 permits a shortening of the current path between the first and second contact portions 101, 103 through the spring portion 107. The arrangement of the contact raised portion 141 is merely by way of example. Alternatively, the contact raised portion 141 can be arranged on the further first curved portion 112. Two contact raised portions 141 on the two first curved portions 111, 112 are also possible. The further second curved portion 114 can also be provided with a tapered portion 139.

Figure 9:
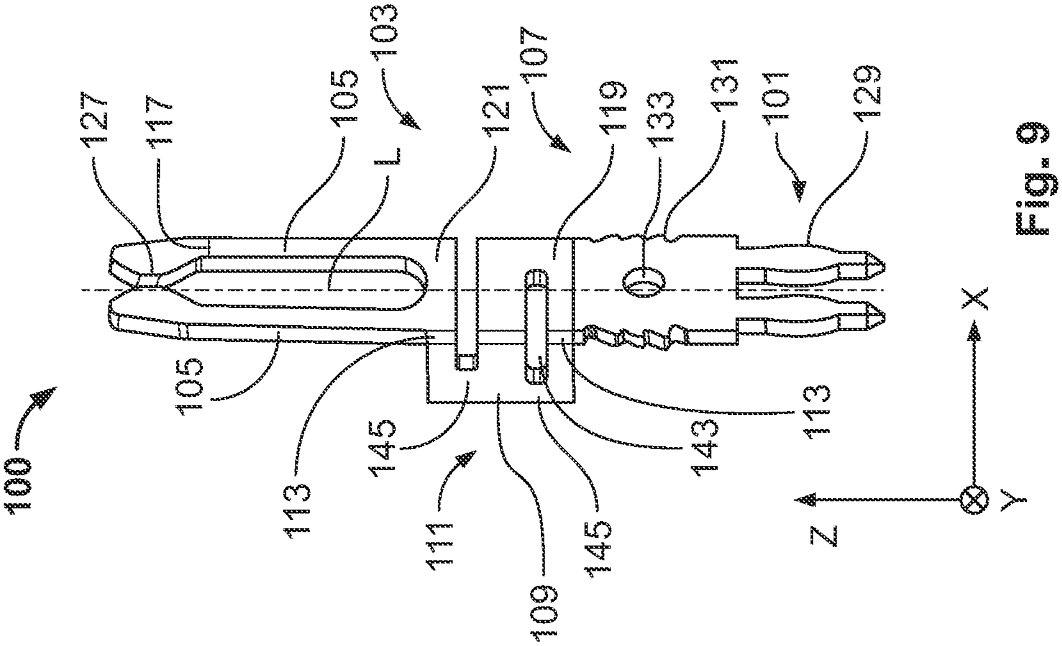
FIG. 9 shows a further schematic view of an electrical circuit board-plug contact device according to a further embodiment.

FIG. 9 shows a further schematic view of an electrical circuit board-plug contact device 100 according to a further embodiment. FIG. 9 is based on the embodiment in FIG. 2. Deviating from the embodiment shown in FIG. 2, in the embodiment of FIG. 9 the spring portion 107, in particular in the first base portion 119, comprises an additional slot element 143. An elastic deformability of the spring portion 107 in the direction of the longitudinal axis L is improved via the slot element 143. The slot element 143 in this case runs in a direction perpendicular to the longitudinal axis L and runs through the curved element 109 into the first curved portion 111. In the embodiment shown, the slot element 143 runs through the second curved portion 113.

Figure 10:
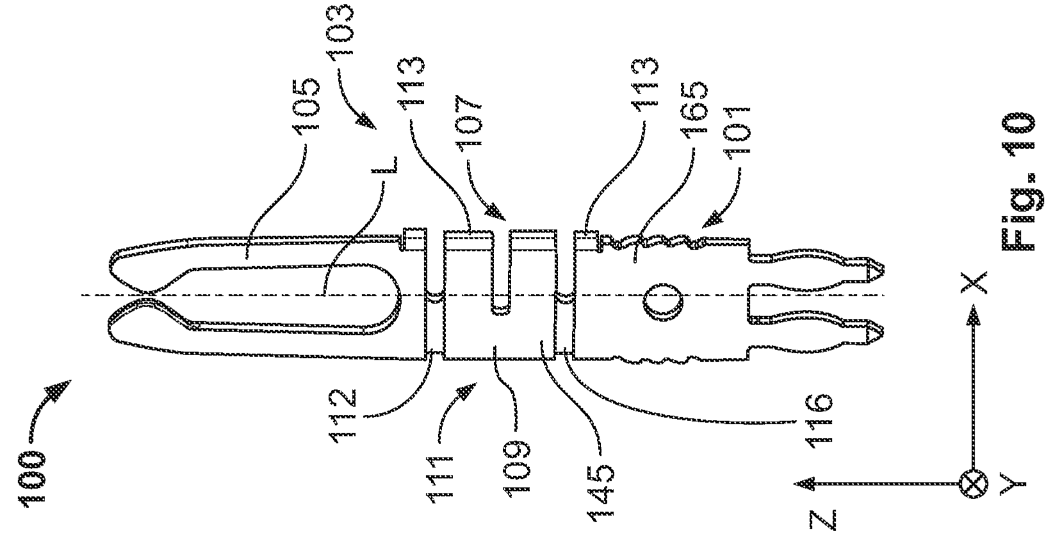
FIG. 10 shows a further schematic view of an electrical circuit board-plug contact device according to a further embodiment.

FIG. 10 shows a further schematic view of an electrical circuit board-plug contact device 100 according to a further embodiment. The embodiment in FIG. 10 is based on the embodiment in FIG. 6. Deviating from the embodiment shown therein, the curved element 109 in the embodiment in FIG. 10 comprises three first curved portions 111, 112 and 116. The curved element 109 is also curved on the second curved portions 113 by 180°. In the embodiment shown, as a result, the first curved portion 111 is arranged on the front face 165 of the plug contact device 100 while the two further first curved portions 112, 116 are arranged on a rear face 166 of the plug contact device 100, due to the curvature on the second curved portion 113 in the opposing direction of curvature.

Figure 11:
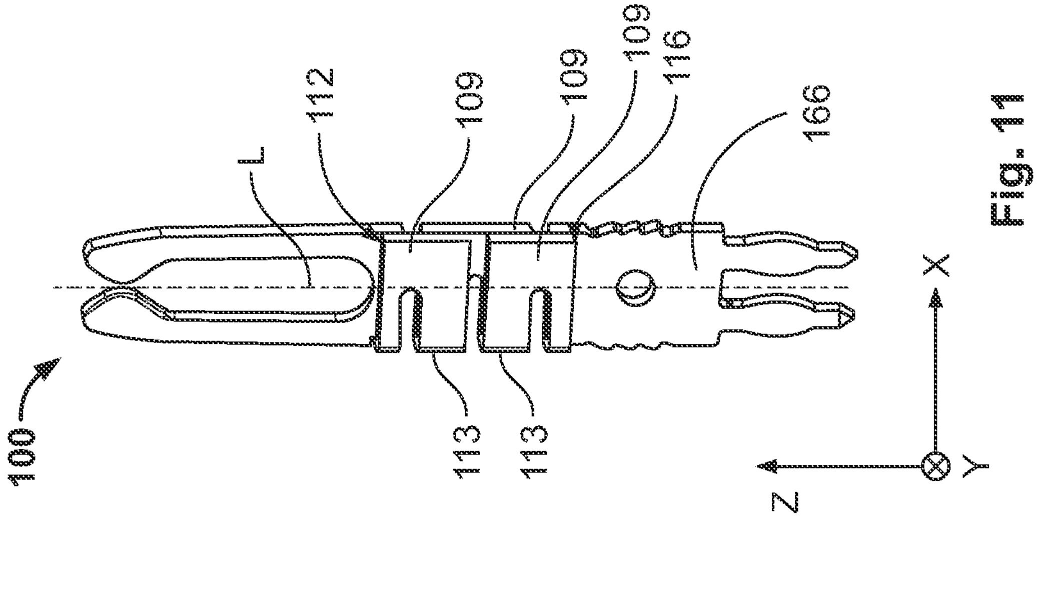
FIG. 11 shows a further schematic view of an electrical circuit board-plug contact device according to a further embodiment.

FIG. 11 shows a further schematic view of an electrical circuit board-plug contact device 100 according to a further embodiment. FIG. 11 shows the rear face 166 of the plug contact device 100 of the embodiment in FIG. 10. The two further first curved portions 112, 116 are as shown in each case arranged parallel to one another and arranged on the rear face 166 of the plug contact device 100, now shown. The two further first curved portions 112, 116 in each case are arranged relative to the longitudinal axis L of the plug contact device 100 above or below the first curved portion 111.

Figure 12:
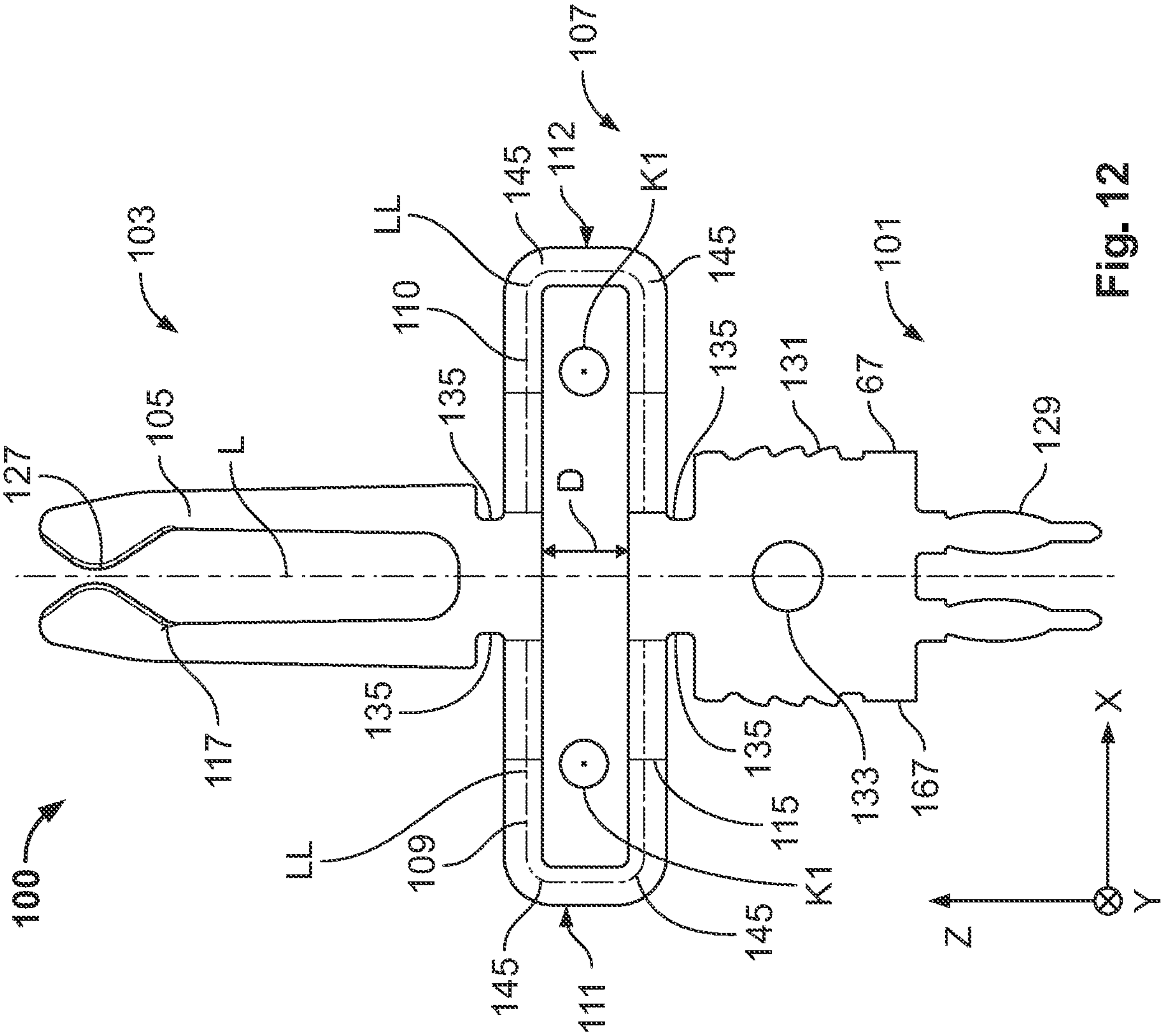
FIG. 12 shows a further schematic view of an electrical circuit board-plug contact device according to a further embodiment.

FIG. 12 shows a further schematic view of an electrical circuit board-plug contact device 100 according to a further embodiment. The embodiment in FIG. 12 is based on the embodiment in FIG. 1. Deviating from the embodiment in FIG. 1, in the embodiment of FIG. 12 the spring portion 107 comprises two curved elements 109, 110. The two curved elements 109, 110 are arranged opposite one another on two opposing edges 167 of the plug contact device 100. The further curved element 110 in the embodiment shown is configured in a comparable manner to the curved element 109. The further curved element 110 comprises a further first curved portion 112 with a curvature of 180° about the first axis of curvature K1. In the further first curved portion 112, the further curved element 110 comprises a direction of curvature opposing the direction of curvature of the first curved portion 111 of the curved element 109. Starting from the second base portion 121 in the direction of the first base portion 110, the curved element 109 comprises a counter-clockwise curvature in the first curved portion 111, while the further curved element 110 comprises a clockwise curvature in the further first curved portion 112. The two curved elements 109, 110 comprise in this case a U-shape which is tilted to the side, wherein the openings of the U-shaped structure in each case face one another.

A symmetrical construction of the spring portion is achieved by the two curved elements 109, 110. Due to the symmetrical construction, a uniform variation of the spacing of the contact portions 101, 103 to one another can be brought about, without the two contact portions 101, 103 being tilted relative to one another with an elastic deformation of the curved elements 109, 110. The two curved elements 109, 110 thus permit the orientation of the two contact portions 101, 103 to one another to be maintained during the elastic deformation. This permits a precise variation of the spacing of the contact portions 101, 103 to one another without an undesired canting or tilting of the contact portions 101, 103 to one another occurring, and associated therewith a tilting of the contacted mating contact element relative to the electrical circuit board.

Figure 13:
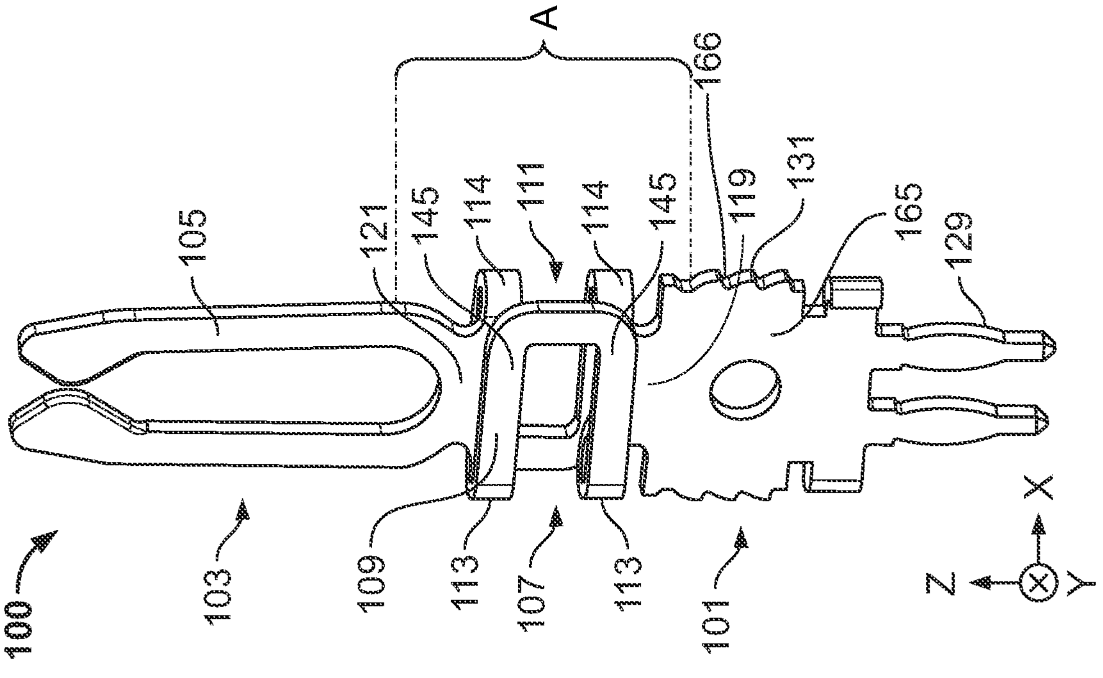
FIG. 13 shows a further schematic view of an electrical circuit board-plug contact device according to a further embodiment.

FIG. 13 shows a further schematic view of an electrical circuit board-plug contact device 100 according to a further embodiment. The embodiment in FIG. 13 is based on the embodiment in FIG. 12. In the embodiment shown, the two curved elements 109, 110 also comprise a curvature of in each case 180° in a second curved portion 113. The two curved elements 109, 110 in this case are curved in the second curved portions 113, 114 in an opposing direction of curvature. As a result, the curved element 109 is arranged on the front face 165 of the plug contact device 100, while the further curved element 110 is arranged on the rear face 166 of the plug contact device 100. The two curved elements 109, 110 run in each case parallel to the surfaces of the front and rear faces 165, 166 of the plug contact device 100.

Figure 14:
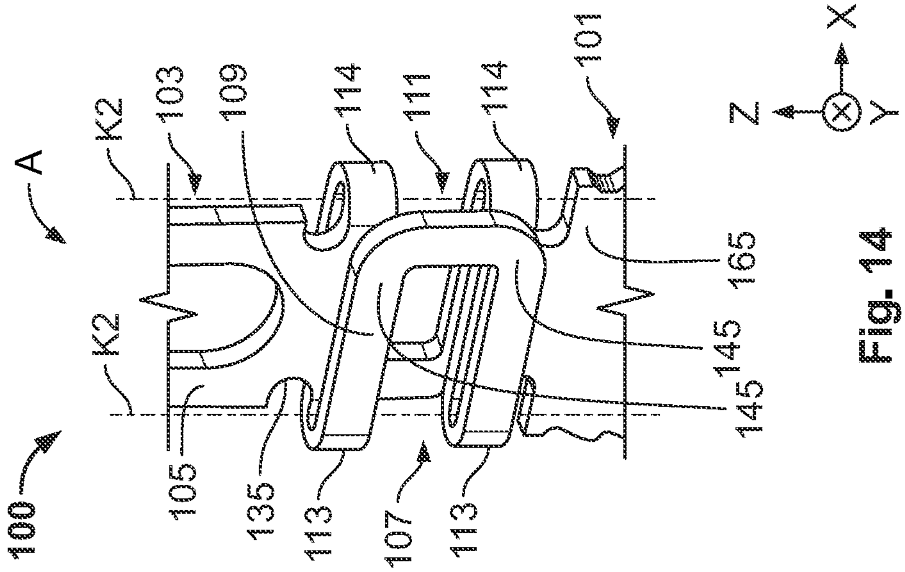
FIG. 14 shows an enlarged schematic view of a spring portion of the electrical circuit board-plug contact device in FIG. 13.

FIG. 14 shows an enlarged schematic view of a spring portion 207 of the electrical circuit board-plug contact device 100 in FIG. 13. FIG. 14 shows an enlarged view of a detailed region A of FIG. 13. FIG. 14 shows the curvature of the two curved elements 109, 110 around the two second curved portions 113, 114, in each case in an opposing direction of curvature in relation to the second axis of curvature K2.

Figure 15:
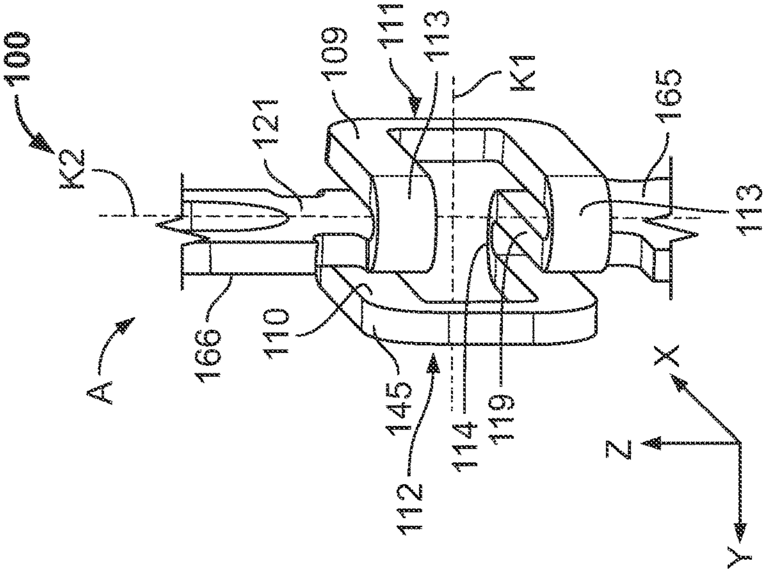
FIG. 15 shows a further enlarged schematic view of a spring portion of the electrical circuit board-plug contact device in FIG. 13.

FIG. 15 shows a further enlarged schematic view of a spring portion 107 of the electrical circuit board-plug contact device 100 in FIG. 13. FIG. 15 shows a side view of the detail in FIG. 14. By the side view, the opposing curvatures of the two curved elements 109, 110 in the two second curved portions 113, 114 are shown about the second axis of curvature K2 running parallel to the longitudinal axis L. Also shown are the opposing directions of curvature of the two first curved portions 111, 112 about the first axis of curvature K1 oriented perpendicular to the longitudinal axis L. Starting from the first base portion 119 in the direction of the second base portion 121, the further curved element 110 comprises a clockwise curvature in the further first curved portion 112 while the curvature of the curved element 109 runs counterclockwise.

Figure 16:
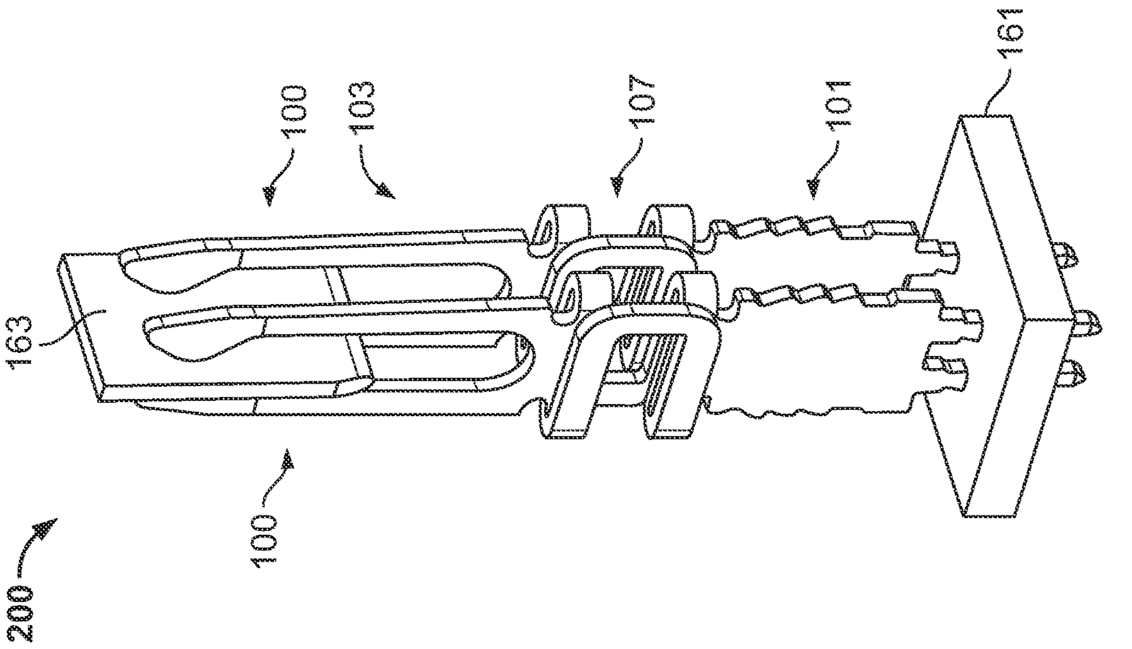
FIG. 16 shows a schematic view of a contact system with an electrical circuit board-plug contact device according to a further embodiment.

FIG. 16 shows a schematic view of a contact system 200 with an electrical circuit board-plug contact device 100 according to a further embodiment. In the embodiment shown in FIG. 16, the contact system 200 comprises two plug contact devices 100 which are arranged on a circuit board 161. The plug contact devices 100 are inserted into the circuit board 161, in each case via the two press-fit pins 129. Moreover, the plug contact devices 100 comprise a plug contact with a mating contact element 163. In the embodiment shown, the mating contact element 163 is configured as a tab and is clamped between the two fork elements 105 of the fork structure of the second contact portion 103. In the embodiment shown, the two plug contact devices 100 are configured according to the embodiment in FIG. 13. FIG. 16 shows merely a detail of a contact system 200. In reality, a contact system 200 according to the invention can comprise a plurality of different plug contact devices 100 according to the same embodiment or according to different embodiments.

Figure 17:
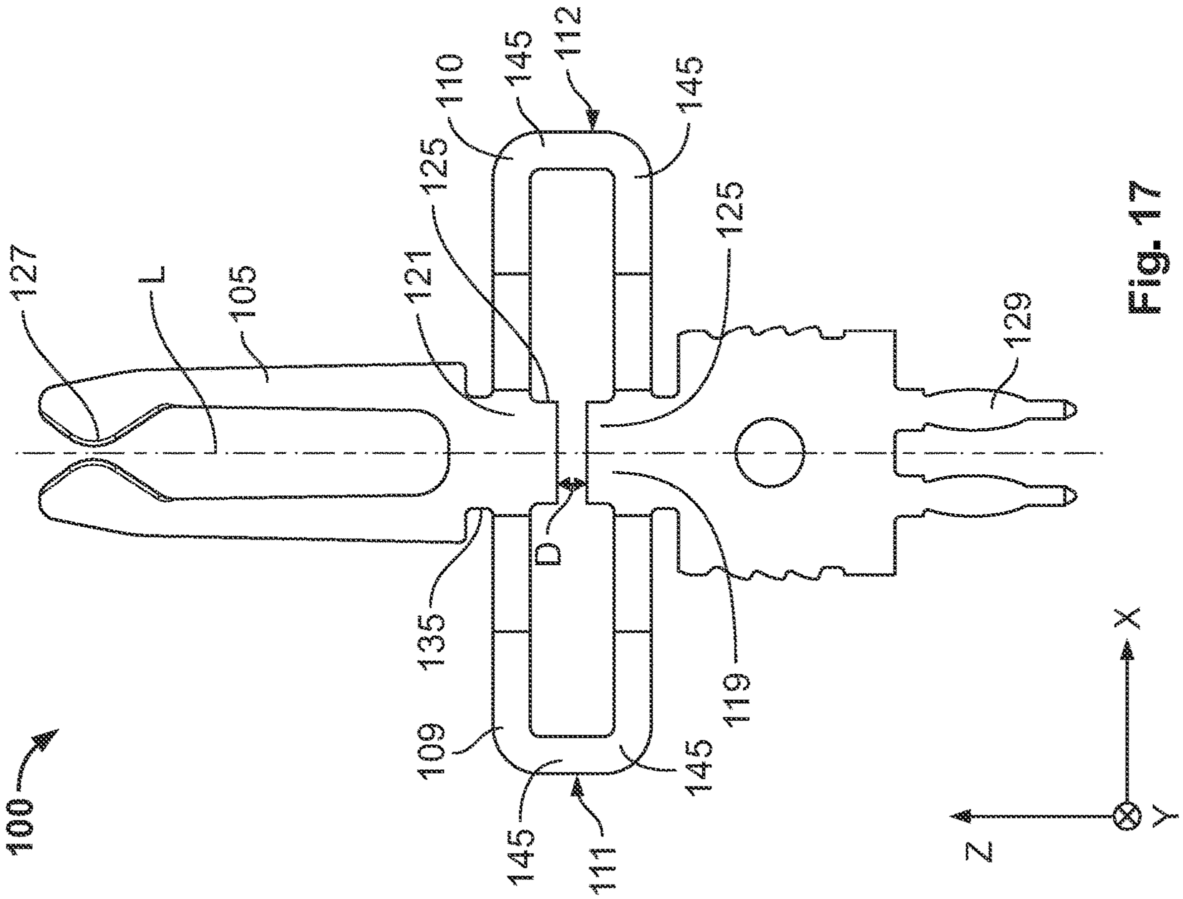
FIG. 17 shows a further schematic view of an electrical circuit board-plug contact device according to a further embodiment.

FIG. 17 shows a further schematic view of an electrical circuit board-plug contact device 100 according to a further embodiment. The embodiment in FIG. 17 is based on the embodiment in FIG. 12. Additionally, the first and second base portions 119, 121 in each case comprise a stop element 125. Via the stop elements 125, which in each case face one another, it is possible to define the variation of the spacing of the first and second contact portions 101, 103 to one another by the elastic deformation of the curved elements 109, 110 of the spring portion 107. The variation of the spacing between the contact portions 101, 103 can be limited via the stop element 125. A plastic deformation of the curved elements 109, 110 can thus be avoided by hitting the stop elements 125.

Figure 18:
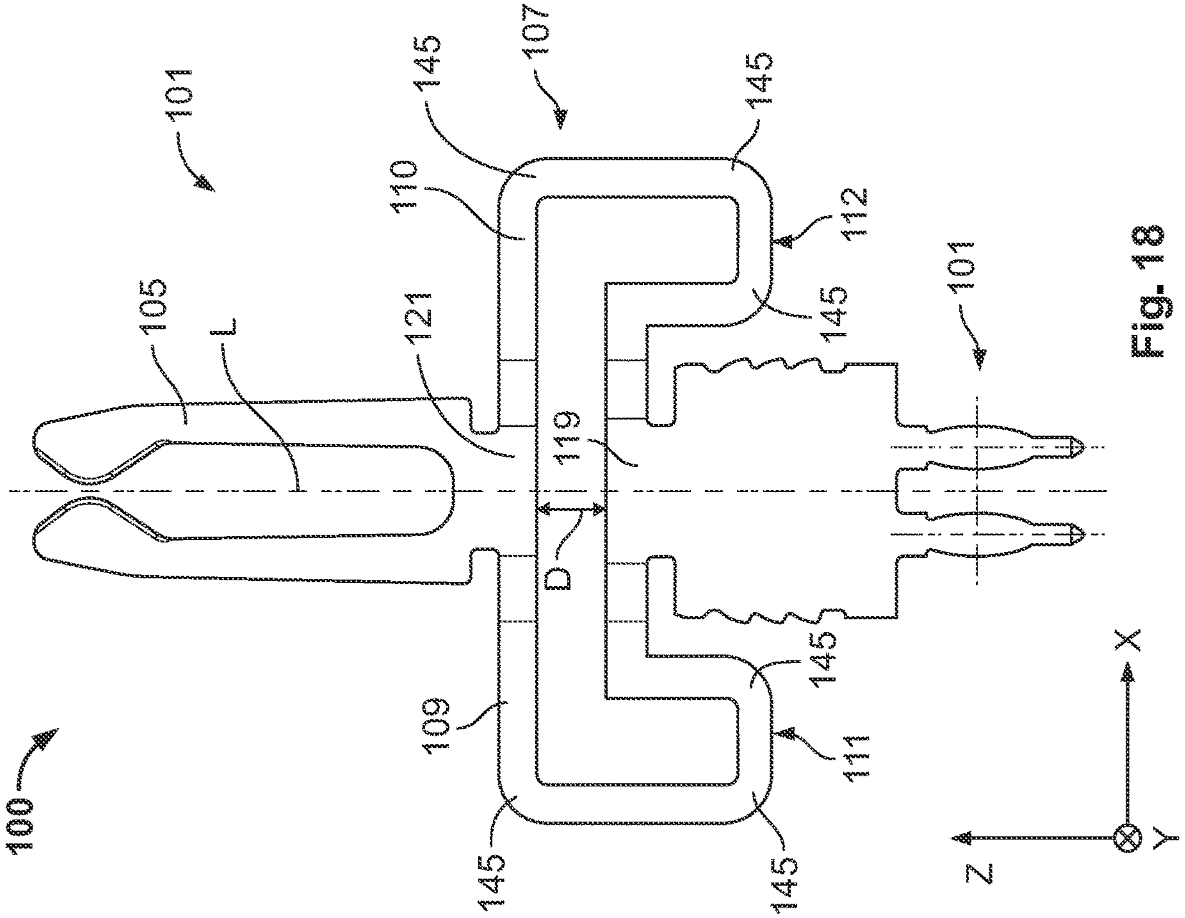
FIG. 18 shows a further schematic view of an electrical circuit board-plug contact device according to a further embodiment.

FIG. 18 shows a further schematic view of an electrical circuit board-plug contact device 100 according to a further embodiment. The embodiment in FIG. 18 is based on the embodiment in FIG. 12. Deviating from the embodiment in FIG. 12, the two curved elements 109, 110 in each case comprise an additional angled element 145. By the two additional angled elements 145, which in each case encompass 90°, the U-shaped first curved portions 111, 112 of the two curved elements 109, 110 are rotated by 90° relative to the embodiment in FIG. 12. The two U-shaped first curved portions 111, 112 are thus arranged parallel to one another and comprise openings in the direction of the longitudinal axis L of the plug contact device 100.

Figure 19:
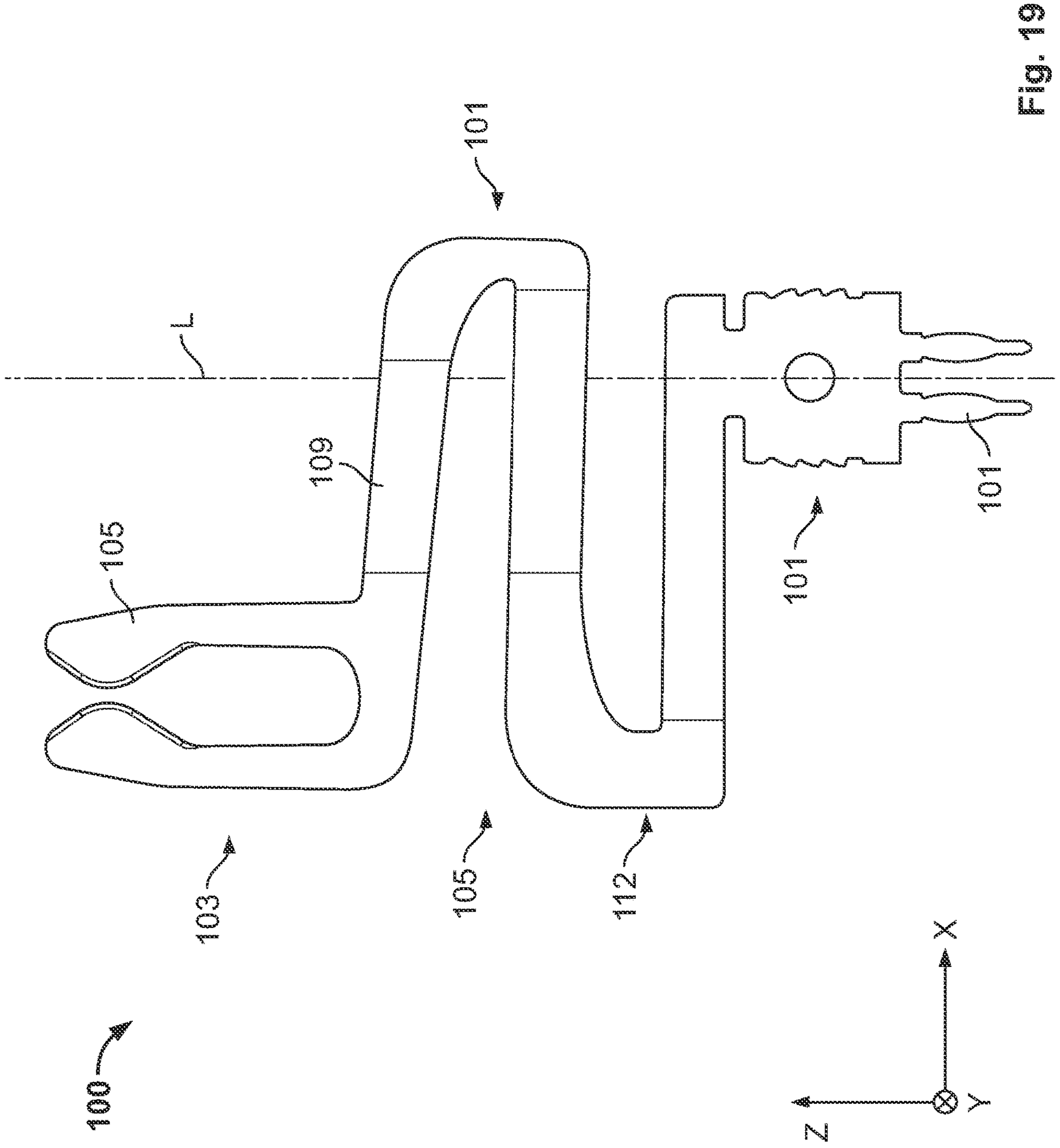
FIG. 19 shows a further schematic view of an electrical circuit board-plug contact device according to a further embodiment.

FIG. 19 shows a further schematic view of an electrical circuit board-plug contact device 100 according to a further embodiment. FIG. 19 is based on the embodiment in FIG. 5.

Deviating from the embodiment in FIG. 5, in the embodiment in FIG. 19 the first and second contact portions 101, 103 are arranged to the side adjacent to one another relative to the longitudinal axis L of the plug contact device 100.

Figure 20:
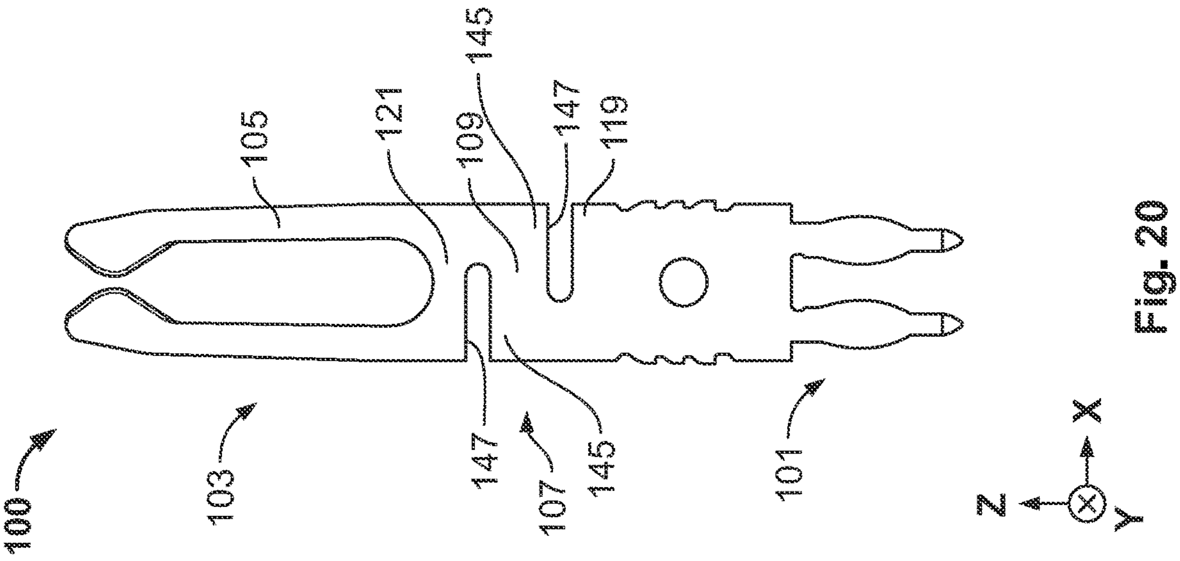
FIG. 20 shows a further schematic view of an electrical circuit board-plug contact device according to a further embodiment.

FIG. 20 shows a further schematic view of an electrical circuit board-plug contact device 100 according to a further embodiment. In the embodiment shown, the curved element 109 comprises two opposing angled elements 145. Moreover, the curved element 109 in the longitudinal direction L comprises two slot recesses 147 arranged one above the other, with in each case opposingly oriented opening directions. An elastic deformability of the curved element 109 in the longitudinal direction L can be achieved via the slot recesses 147.

Figure 21:
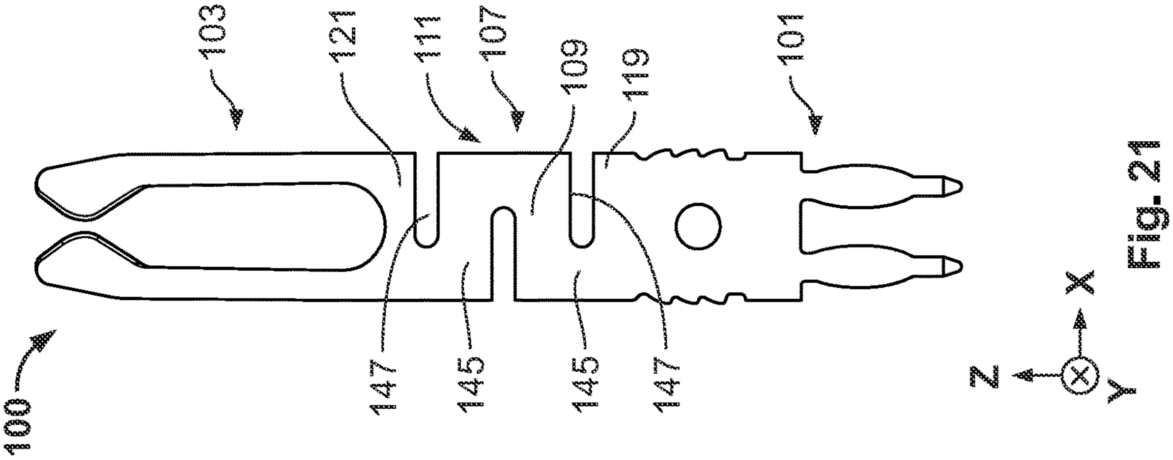
FIG. 21 shows a further schematic view of an electrical circuit board-plug contact device according to a further embodiment.

FIG. 21 shows a further schematic view of an electrical circuit board-plug contact device 100 according to a further embodiment. FIG. 21 is based on the embodiment in FIG. 20. In addition to the embodiment in FIG. 20, the embodiment shown, and in particular the curved element 109, comprise additional slot recesses 147. A first curved portion 111 is generated by the three slot recesses 147 which are arranged one above the other along the longitudinal axis L. In this case, the three slot recesses 147 comprise opposing opening directions, in each case in an alternating sequence.

Figure 22:
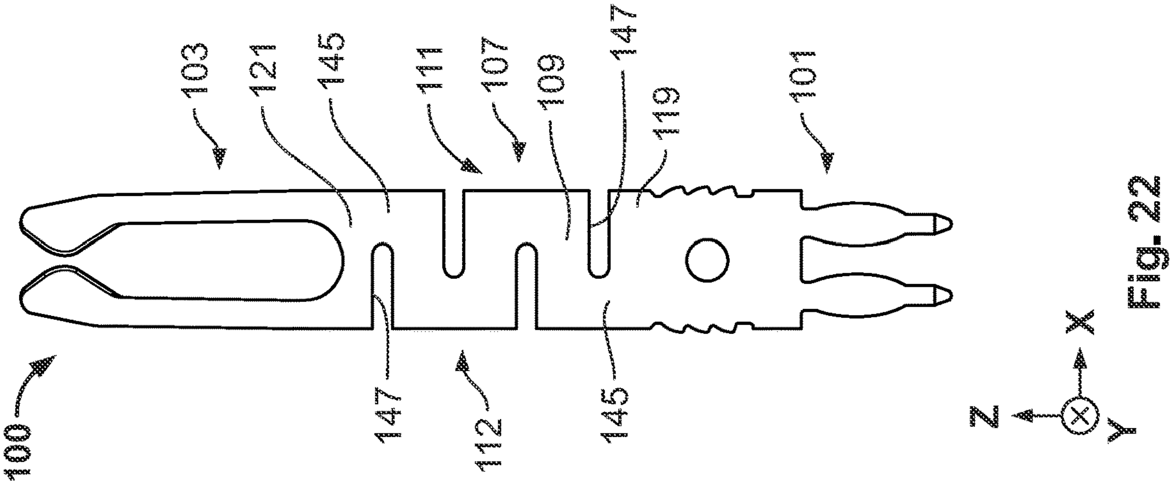
FIG. 22 shows a further schematic view of an electrical circuit board-plug contact device according to a further embodiment.

FIG. 22 shows a further schematic view of an electrical circuit board-plug contact device 100 according to a further embodiment. The embodiment shown is based on the embodiment in FIG. 21. In the embodiment shown, the curved element 109 comprises a further fourth slot recess 147. The four slot recesses 147 are arranged along the longitudinal axis L and comprise opposing opening directions in an alternating sequence. Due to the four opposingly oriented slot recesses 147, the curved element 109 comprises two first curved portions 111, 112 with an opposing direction of curvature. An elastic deformability of the curved element 109 in the longitudinal direction L is permitted via the first curved portions 111, 112 and the slot recesses 147. Via the number of slot recesses 147, a spring rate of the curved element 109 can be set in a variable manner. The embodiment of FIG. 22 thus comprises a higher spring rate than the embodiment of FIG. 21, which in turn comprises a higher spring rate than the embodiment of FIG. 20.

Figure 23:
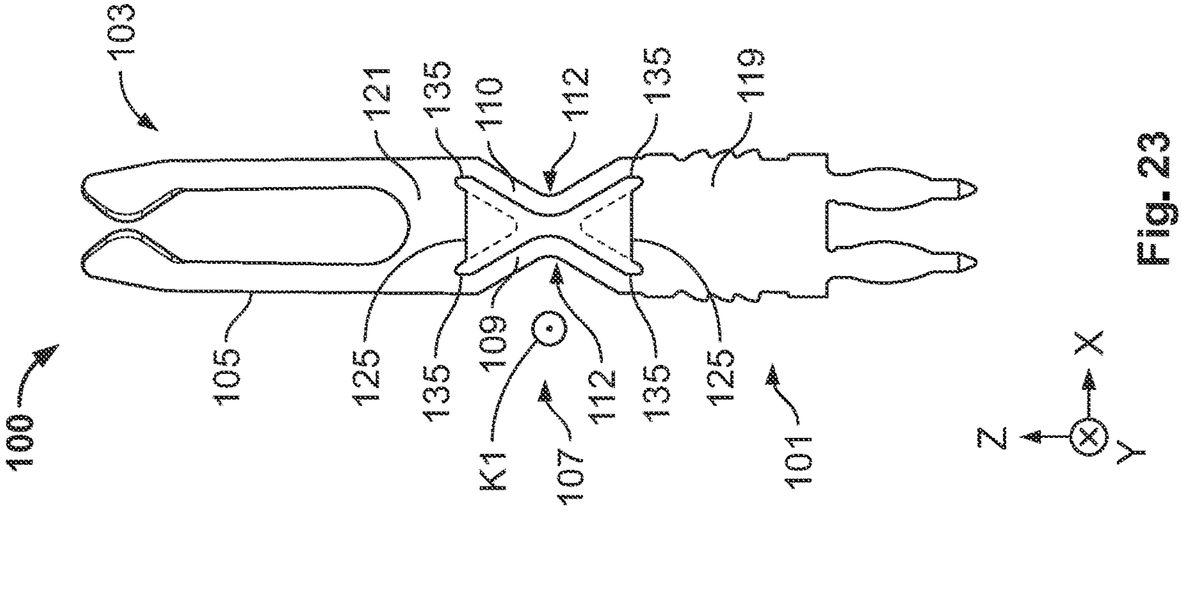
FIG. 23 shows a further schematic view of an electrical circuit board-plug contact device according to a further embodiment.

FIG. 23 show as further schematic view of an electrical circuit board-plug contact device 100 according to a further embodiment. In the embodiment shown, the spring portion 107 comprises two adjacently arranged curved elements 109, 110. In the embodiment shown, the curved elements 109, 110 are configured to be bar-shaped and in each case comprise first curved portions 111, 112 provided with an opposing direction of curvature. In the first curved portions 111, 112 the adjacently arranged curved elements 109, 110 comprise a curvature about the first axis of curvature K1 arranged perpendicular to the longitudinal axis L. In the embodiment shown, the two bar-shaped curved elements 109, 110, which are arranged on the edge regions of the first and second base portions 119, 121 in the first curved portion 111, 112, are curved inwardly in the direction of a geometric center of the plug contact device 100. The first curved portions 111, 112 of the two curved elements 109, 110 in each case comprise an angle of curvature of less than 90°. The first and second base portions 119, 121 also comprise in each case a stop element 125 and two recesses 135.

Figure 24:
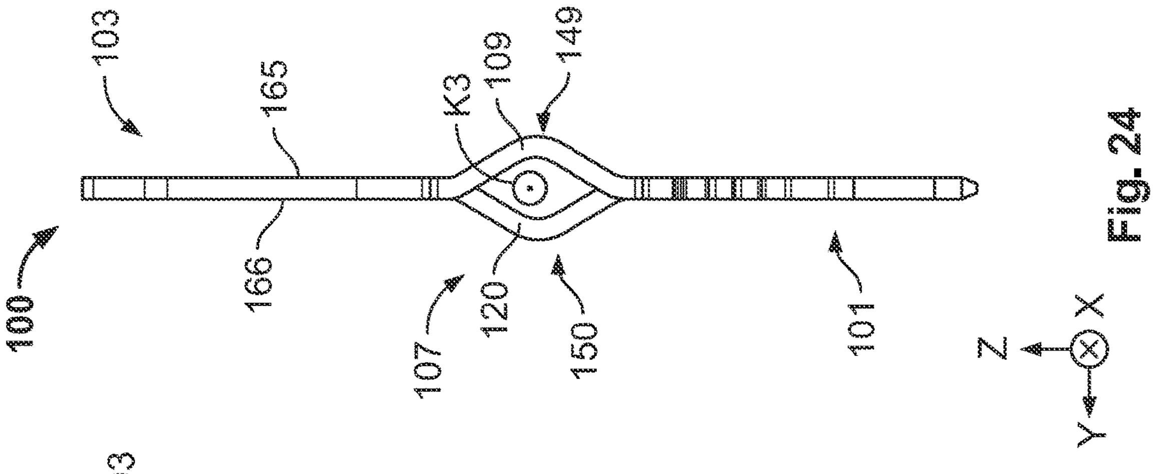
FIG. 24 shows a further schematic view of an electrical circuit board-plug contact device according to a further embodiment.

FIG. 24 shows a further schematic view of an electrical circuit board-plug contact device 100 according to a further embodiment. The embodiment shown is based on the embodiment in FIG. 23. In FIG. 24, a side view of the plug contact device 100 is shown. In the embodiment shown, the two curved elements 109, 110 also comprise a third curved portion 149, 150 in which the respective curved element 109, 110 is curved about a third axis of curvature K3 arranged perpendicular to the first and second axes of curvature K1, K2. The curvatures of the two third curved portions 149, 150 of the two curved elements 109, 110 comprise in each case different directions of curvature relative to the third axis of curvature K3. The curved element 109 is thus curved toward the front face 165 of the plug contact device 100, while the further curved element 110 is curved toward a rear face 166 of the plug contact device 100.

Figure 25:
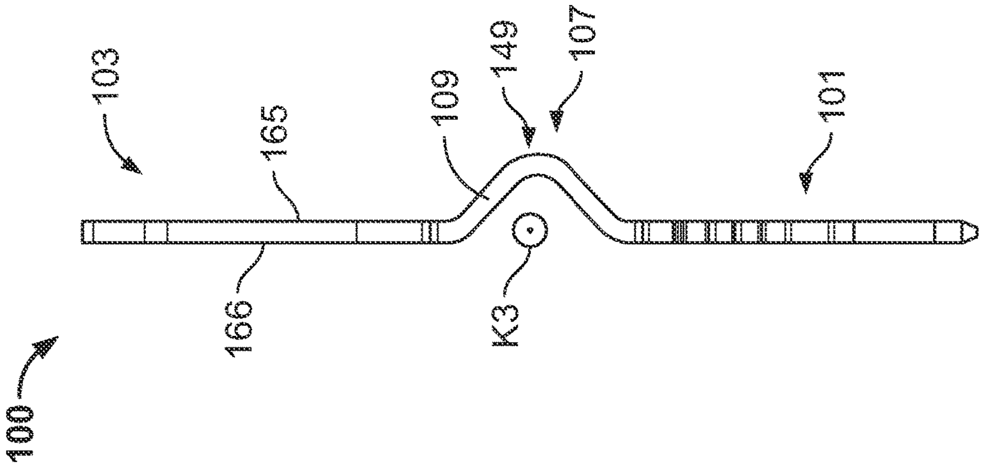
FIG. 25 shows a further schematic view of an electrical circuit board-plug contact device according to a further embodiment.

FIG. 25 shows a further schematic view of an electrical circuit board-plug contact device 100 according to a further embodiment. The embodiment shown is based on the embodiment in FIG. 24. Deviating therefrom, however, the two curved elements 109, 110 in the third curved portions 149, 150 comprise identical directions of curvature relative to the third axis of curvature K3. Both curved elements 109, 110 are in this case curved toward the front face 165 of the plug contact device 100.

Figure 26:
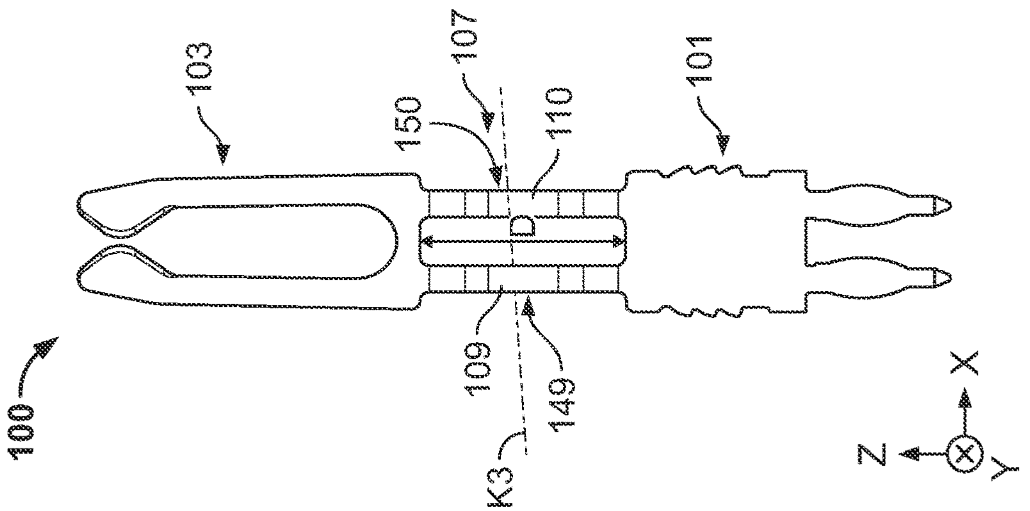
FIG. 26 shows a further schematic view of an electrical circuit board-plug contact device according to a further embodiment.

FIG. 26 shows a further schematic view of an electrical circuit board-plug contact device 100 according to a further embodiment. In the embodiment shown, the spring portion 107 comprises two adjacently arranged bar-shaped curved elements 109, 110. In the embodiment shown, the curved elements 109, 110 are merely curved about the third axis of curvature K3 arranged perpendicular to the first and second axes of curvature K1, K2 and comprise two corresponding third curved portions 149, 150. FIG. 26 shows a front view of the plug contact device 100. The curvatures of the curved elements 109, 110 thus cannot be identified in the view shown.

Figure 27:
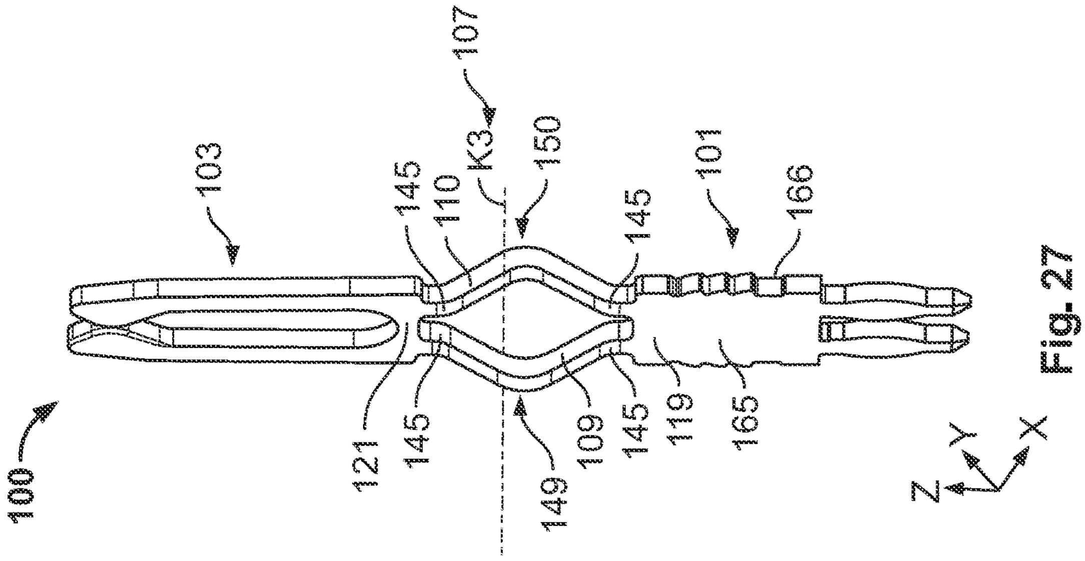
FIG. 27 shows a further schematic view of an electrical circuit board-plug contact device according to a further embodiment.

FIG. 27 shows a further schematic view of an electrical circuit board-plug contact device 100 according to a further embodiment. FIG. 27 shows a rotated view of the plug contact device 100 of FIG. 26. In FIG. 27, the curvatures of the two curved elements 109, 110 are shown about the third axis of curvature K3 in the third curved portions 149, 150. The third curved portions 149, 150 of the two curved elements 109, 110 comprise in this case opposing directions of curvature relative to the third axis of curvature K3. As a result, the curved element 109 is curved toward the front face 165 of the plug contact device 100, while the further curved element 110 is curved toward the rear face 166. To this end, the curved elements 109, 110 in each case comprise angled elements 145 on the first and second base portions 119, 121. In the embodiment shown, the angled elements 145 in this case comprise angles of less than 90°.

Figure 28:
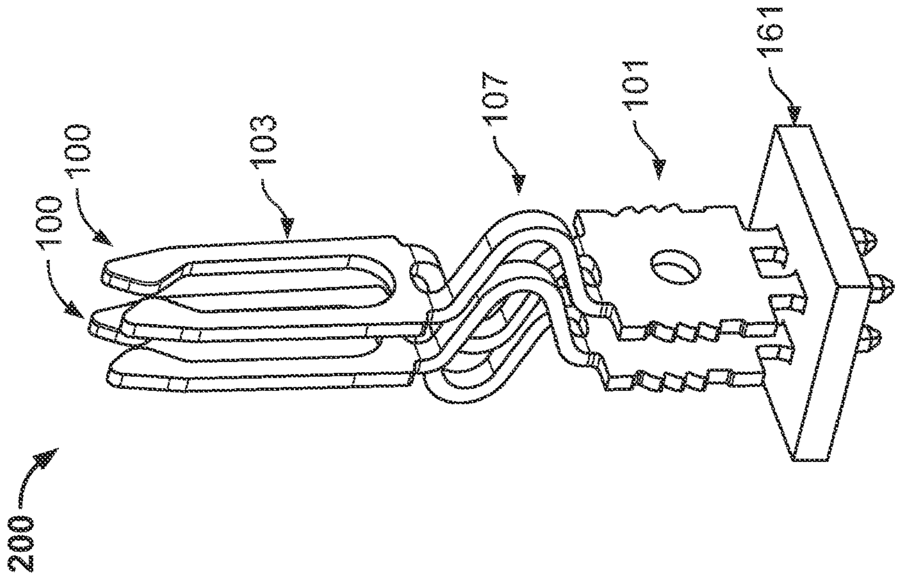
FIG. 28 shows a schematic view of a contact system with an electrical circuit board-plug contact device according to a further embodiment.

FIG. 28 shows a schematic view of a contact system 200 with an electrical circuit board-plug contact device 100 according to a further embodiment. In the embodiment shown, the contact system 200 comprises two adjacently arranged plug contact devices 100 which are fixed in a circuit board 161. In the embodiment shown, the two plug contact devices 100 are configured according to the embodiment in FIG. 26 or FIG. 27.

Figure 29:
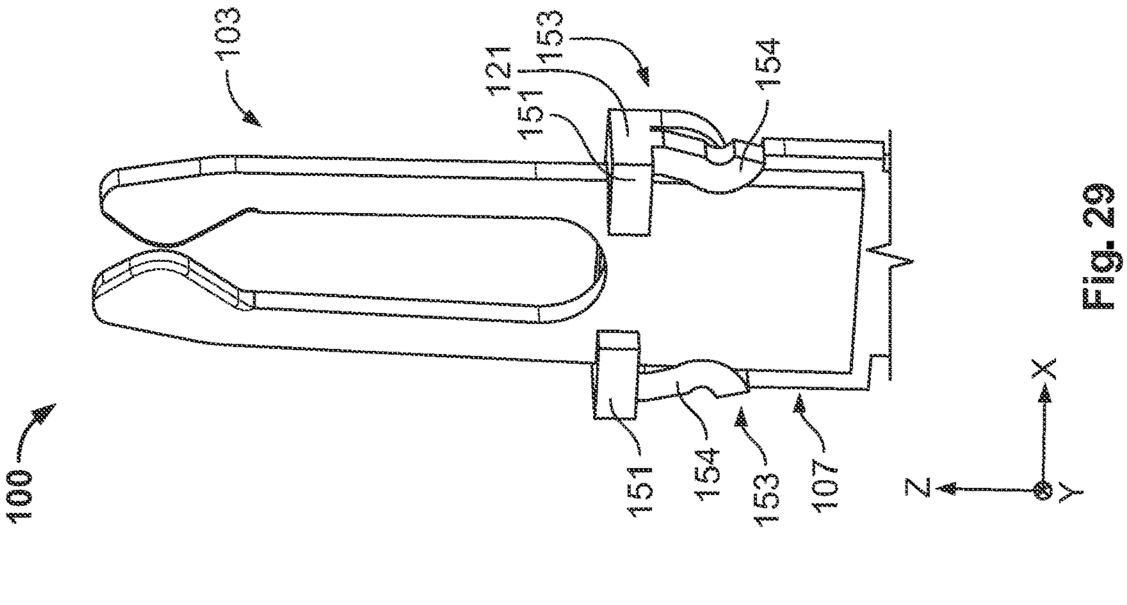
FIG. 29 shows a further schematic view of an electrical circuit board-plug contact device according to a further embodiment.

FIG. 29 shows a further schematic view of an electrical circuit board-plug contact device 100 according to a further embodiment.

Figure 31:
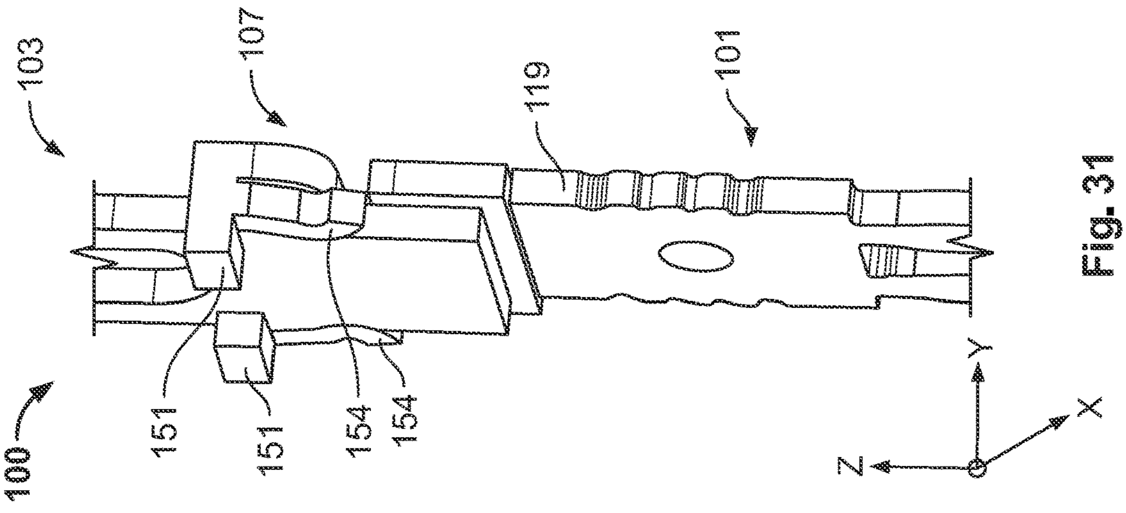
FIG. 31 shows a further schematic view of an electrical circuit board-plug contact device according to a further embodiment.
Figure 30:
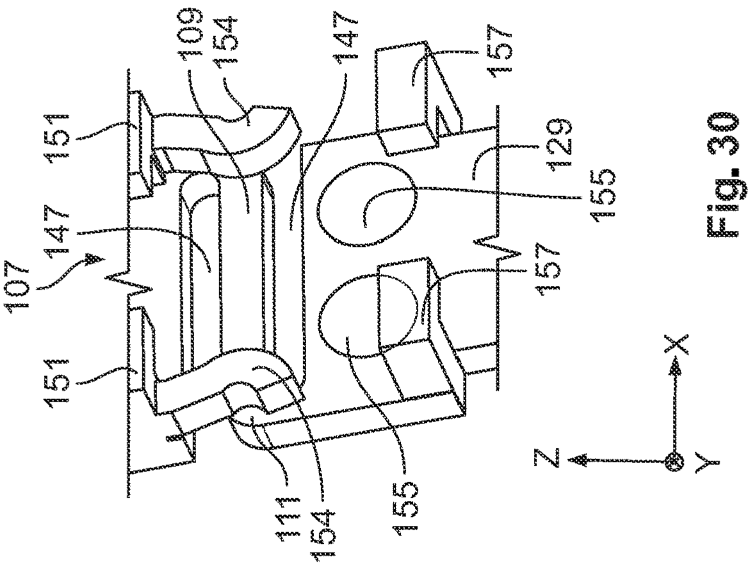
FIG. 30 shows a schematic view of a spring portion of an electrical circuit board-plug contact device according to a further embodiment.

FIGS. 29, 30 and 31 show in each case different views of an embodiment of the plug contact device 100 in which the plug contact device 100 is configured in two-part form. To this end, the second contact portion 103 is configured separately as an independent component. The first contact portion 101 and the spring portion 107, however, are configured in one piece. According to the invention, the spring portion 107 comprises a curved element 109 which is elastically deformable along the longitudinal axis L. In the embodiment shown, the spring portion 107 comprises in each case two first clamp elements 151 on the second base portion 121. Two latching lugs 154 of a latching connection 153 are also arranged on the first clamp elements 151 which are configured on opposing edges 167 of the second base portion 121. The second contact portion 103 can be fixed to the spring portion 107 via the first clamp elements 151 and the latching connection 153. To this end, the second contact portion 103 can be inserted in the first clamp elements 151 until a latching takes place between the latching lugs 154 and the latching recesses, not shown in FIG. 29, of the second contact portion 103. A secure fixing of the second contact portion 103 to the spring portion 107 is achieved by the first clamp elements 151 and the latching connection 153.

FIG. 30 shows a schematic view of a spring portion 107 of an electrical circuit board-plug contact device 100 according to a further embodiment. In the embodiment shown, the spring portion 107 also comprises two second clamp elements 157. The second clamp elements 157 are arranged on two opposing sides of the first base portion 119 of the spring portion 107. The first clamp elements 151, which are only partially visible in the view shown, and the second clamp elements 157 are configured uniformly relative to one another. A secure fixing of the second contact portion 103 to the spring portion 107 can be achieved by inserting the second contact portion 103 into the first clamp elements 151 and the second clamp elements 157 and by latching the latching lugs 154 into the latching openings of the second contact portion 103 correspondingly provided therefor. In the embodiment shown, the spring portion 107 also comprises two contact projections 155 in the region of the first base portion 119. An electrical contact between the inserted second contact portion 103 and the spring portion 107 can be achieved via the contact projections 155. As is visible in FIG. 30, the spring portion 107 also comprises a curved element 109 in the two-part embodiment of the plug contact device 100. In the embodiment shown, the curved element 109 comprises two slot recesses 147 which are arranged one above the other in the longitudinal direction L and which in each case comprise opposing opening directions. As a result, the curved element 109 comprises a first curved portion 111 with a curvature about the first axis of curvature K1.

FIG. 31 shows a further schematic view of an electrical circuit board-plug contact device 100 according to a further embodiment. FIG. 31 shows a rotated view of the embodiment in FIG. 29. A secure connection of the second contact portion 103 inserted into the first clamp elements 151 with the spring portion 107 is brought about via the latching connection 153. The spring portion 107 is connected integrally to the first contact portion 101.

Figure 32:
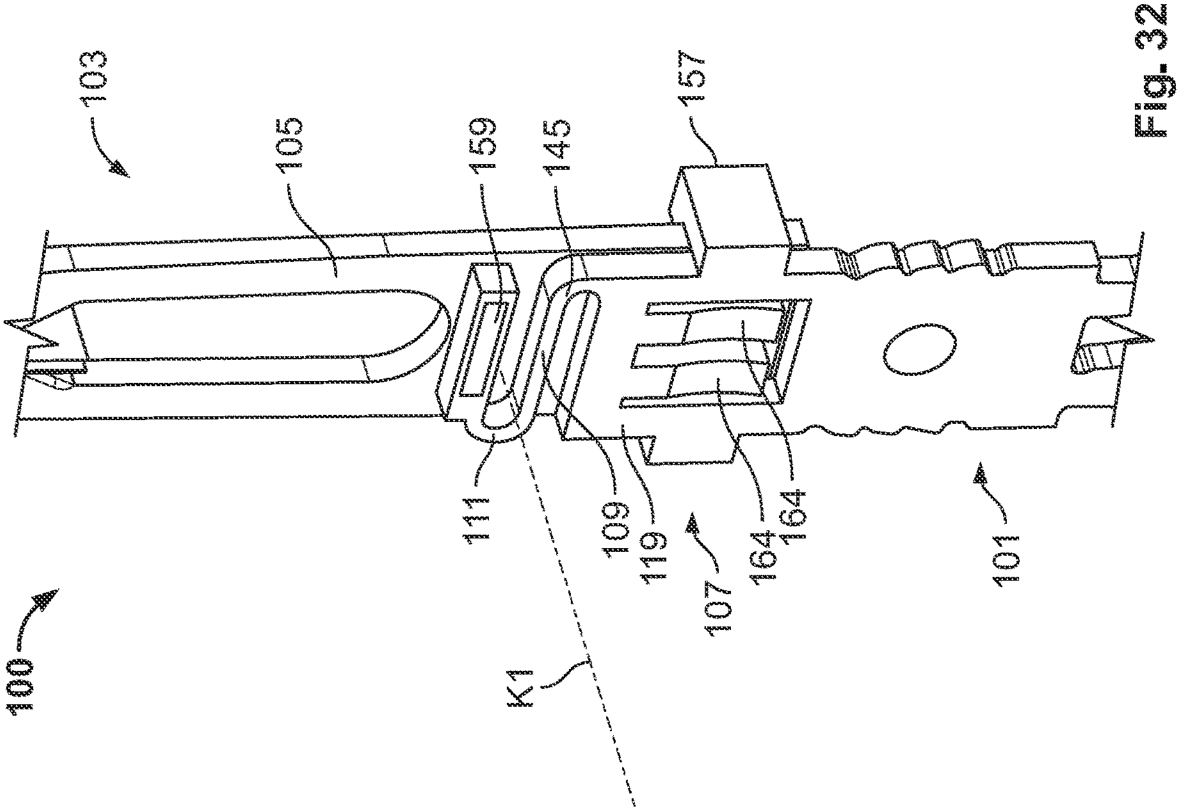
FIG. 32 shows a further schematic view of an electrical circuit board-plug contact device according to a further embodiment.

FIG. 32 shows a further schematic view of an electrical circuit board-plug contact device 100 according to a further embodiment. In the embodiment shown, in the first base portion 119 the spring portion 107 comprises second clamp elements 157 arranged on two opposing sides. By inserting the second contact portion 103 into the second clamp elements 157, the second contact portion 103 can be arranged on the spring portion 107 which is integrally connected to the first contact portion 101. A fixing of the second contact portion 103 inserted into the second clamp elements 157 can be achieved via a joint 159 which is arranged on the curved element 109. The joint 159 can be configured, for example, as a welded connection or implemented by clinching. Two mating tensioning elements 164 are also arranged on the second base portion 121. By means of the mating tensioning elements 164, a compressive force can be exerted on the second contact portion 103 inserted into the second clamp elements 157. A fixing of the second contact portion 103 can be achieved by the compressive force. In the embodiment shown, the curved element 109 is configured to be S-shaped and comprises a first curved portion 111 with a curvature relative to the first axis of curvature K1. Due to the fixing of the curved element 109 to the second contact portion 103 by the joint and by the displaceable arrangement of the second contact portion 103 in the second clamp elements 157, the second contact portion 103 can be displaced along the longitudinal axis L relative to the first contact portion 101. A restoring force can be brought about by the elastic deformability of the curved element 109, whereby the second contact portion 103 can be pushed away from the first contact portion 101 or pushed toward the first contact portion. Vibrations between the mating contact element 163 and the circuit board 161 can be compensated thereby.

Figure 33:
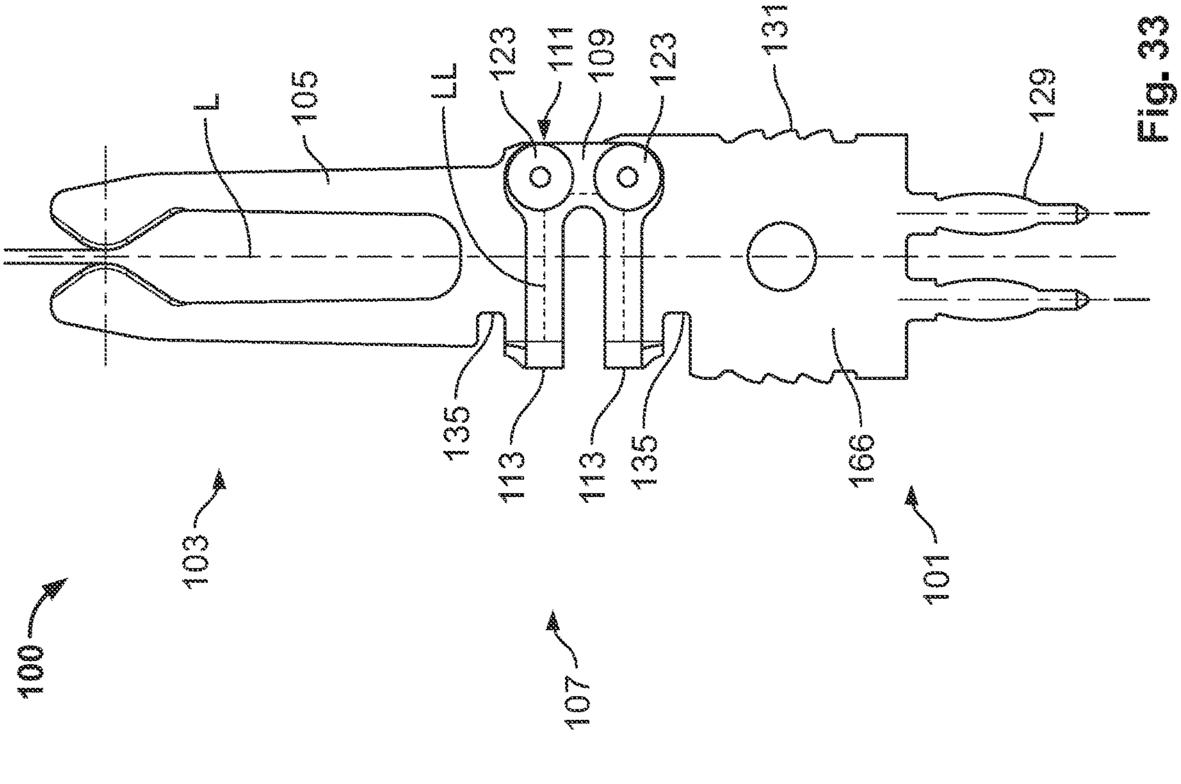
FIG. 33 shows a further schematic view of an electrical circuit board-plug contact device according to a further embodiment.

FIG. 33 shows a further schematic view of an electrical circuit board-plug contact device 100 according to a further embodiment. The embodiment shown in FIG. 33 is based on the embodiment in FIG. 3. Deviating from the embodiment in FIG. 3, the contact elements 123 are not configured on the first and second base portions 119, 121 but on the curved element 109 and, in particular, in the first curved region 111 of the curved element 109. A contact of the first curved portion 111 of the curved element, which is arranged due to the curvature around the second axis of curvature K2 parallel to the surface of the rear face 166 of the plug contact device 100, can be achieved with the first and second base portions 119, 121 via the contact elements 123. To this end, the two contact elements 123 are arranged one above another relative to the longitudinal axis L. Thus the first base portion 119 is contacted by a contact element 123 and the second base portion 121 is contacted by the other contact elements 123. Thus the current flow runs between the first and second base portions 119, 121, through the contact elements 123, directly through the first curved portion 111 of the curved element 109. A current flow through the complete curved element 109 in the longitudinal direction LL of the curved element 109 thus can be shortened and reduced or prevented.

Figure 34:
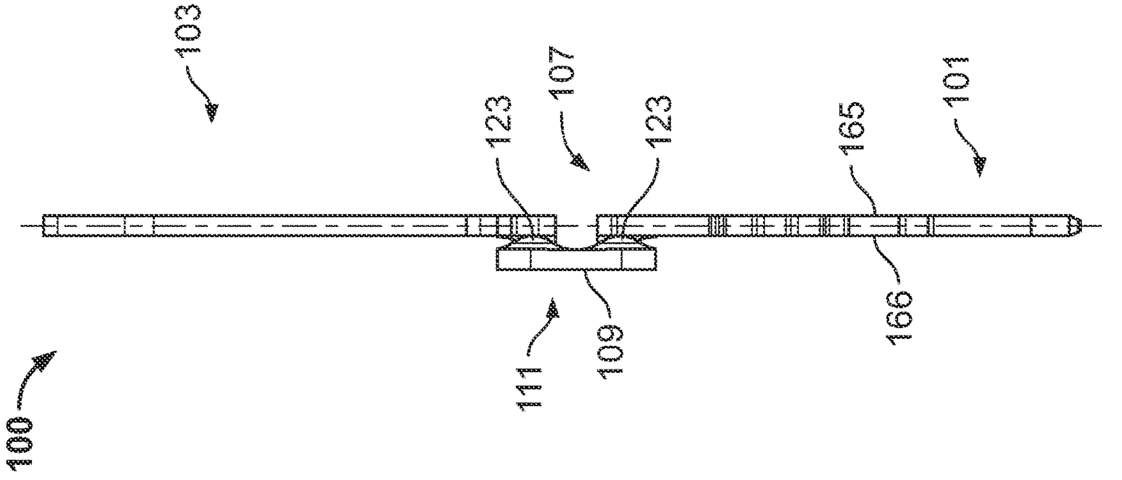
FIG. 34 shows a schematic view of the electrical circuit board-plug contact device in FIG. 33 in a side view.

FIG. 34 shows a schematic side view of the electrical circuit board-plug contact device 100 in FIG. 33. As is visible in FIG. 34, due to the curvature of the curved element 109 around the second axis of curvature K1, the contact elements 123 arranged on the first curved portion 111 of the curved element 109 can bring about a contact with the first and second base portions 119, 121 of the spring portion. In the embodiment shown, the contact elements 123 are configured as raised portions which protrude from the surface of the rear face 166 of the curved element. The contact elements 123 can be obtained, for example, by a stamping process.

In the embodiments shown and described above, the plug contact device 100 can be manufactured from a sheet metal material. In particular, the sheet metal material can be a copper composite, for example a copper-nickel-silicon composite. The sheet metal material can comprise a wall thickness of 0.6 to 1 mm. The plug contact device 100 can be manufactured by a stamping process, by which an outer edging of the plug contact device 100 can be obtained. The curved portions of the curved elements 109, 110 can also be obtained either by a stamping process, by slot recesses 147 being stamped out from the curved elements 109 in the spring portion 107. Alternatively, the curved portions of the different curved elements 109, 110 can be produced by bending processes, by the corresponding curved elements 109, 110 being bent about the corresponding axes of curvature K1, K2, K3. The plug contact device 100 can be configured, for example, with an overall height of ca. 30 mm relative to the z-axis and an overall width of ca. 7.5 mm relative to the x-axis of the coordinate systems shown. A smallest width 117 of the fork elements 105 can, for example, be 1 mm and a length in the z-direction can be approximately 11 mm.

The embodiments shown above are merely by way of example and are not intended to limit the present invention. In particular, the features described in the context of the individual embodiments can be combined together in any manner. Thus embodiments which are not explicitly shown in FIGS. 1 to 32 are covered by the protected scope of the present invention.

The circuit board-plug contact device 100 according to the embodiments can be designed for electrical voltages of at least approximately 250 V, 500 V, 750 V, 1 kV, 1.25 kV or 1.5 kV and/or for electrical currents of at least approximately 20 A, 40 A, 60 A, 75 A, 100 A, 125 A, 150 A or 200 A. To this end, it can be advantageous to use a plurality of circuit board-plug contact devices 100 for contacting and for receiving the high voltages. It is naturally possible to design the circuit board-plug contact device 100 for voltages below 250 V and/or currents below 20 A. The circuit board-plug contact device 100 may be designed for an operating temperature of approximately 40° C. to approximately 120°, 140° C., 150° C., 160° C., 170° C., 180° C., 190° C. or 200° C.

According to a further aspect of the invention, an electrical entity, in particular a populated circuit board for a vehicle, is provided, wherein the entity comprises an electrical circuit board and an electrical circuit board-plug contact device 100 arranged on the electrical circuit board according to one of the above embodiments. As a result, the technical advantage can be achieved that an improved electrical entity in the form of a circuit board with at least one improved electrical circuit board-plug contact device according to the invention can be provided with the aforementioned technical advantages.

What is claimed is:

1. An electrical contact device, comprising:

a first electrical contact portion mechanically fixing and electrically connecting the electrical contact device to a circuit board by press-fitting;

a second electrical contact portion forming an electrical plug contact matable with an electrical mating contact element, the second electrical contact portion has a fork structure with a pair of fork elements mechanically clamping and fixing the electrical mating contact element on the electrical contact device, the first electrical contact portion and/or the second electrical contact portion has a stop element, the stop element faces the other of the first electrical contact portion and the second electrical contact portion; and a spring portion arranged between the first and second electrical contact portions in a longitudinal direction of the electrical contact device, the spring portion electrically connects the first and second contact portions, the spring portion permits an elastic variation of a spacing between the first and second electrical contact portions in the longitudinal direction.

2. The electrical contact device of claim 1, wherein the spring portion has a curved element with a first curved portion.

3. The electrical contact device of claim 2, wherein the first curved portion has a curvature about a first axis of curvature oriented perpendicular to the longitudinal axis and the curved element can be elastically deformed along the longitudinal axis.

4. The electrical contact device of claim 3, wherein the curved element has a second curved portion with a curvature about a second axis of curvature oriented parallel to the longitudinal axis.

5. The electrical contact device of claim 4, wherein the curved element in the first curved portion and/or in the second curved portion has a curvature of 180° about the first axis of curvature or the second axis of curvature.

6. The electrical contact device of claim 3, wherein the curved element has a pair of first curved portions with opposing directions of curvature about the first axis of curvature.

7. The electrical contact device of claim 2, wherein the curved element transmits an electrical current between the first electrical contact portion and the second electrical contact portion.

8. The electrical contact device of claim 2, wherein the curved element is a curved bar element.

9. The electrical contact device of claim 2, wherein a width of the curved element corresponds to a smallest width of one of the fork elements.

10. The electrical contact device of claim 2, wherein the spring portion has a first base portion contacting the first electrical contact portion and a second base portion contacting the second electrical contact portion.

11. The electrical contact device of claim 10, wherein the curved element is connected to the first base portion and the second base portion.

12. The electrical contact device of claim 11, wherein the first base portion and the second base portion each have a contact element respectively protruding from the first base portion and the second base portion, the first curved portion is contacted by the contact element.

13. The electrical contact device of claim 4, wherein the first curved portion and/or the second curved portion is formed by bending.

14. The electrical contact device of claim 1, wherein the spring portion has a pair of curved elements with curvatures in opposing directions.

15. The electrical contact device of claim 1, wherein the spring portion is integrally connected to the first electrical contact portion and the second electrical contact portion.

16. The electrical contact device of claim 1, wherein the spring portion is integrally configured on the first electrical contact portion and connected to the second electrical contact portion by a latching connection and/or a joint.

17. The electrical contact device of claim 1, wherein the first electrical contact portion and the second electrical contact portion are arranged laterally offset to one another relative to the longitudinal direction.

18. An electrical contact system, comprising:

an electrical circuit board; and a pair of electrical contact devices adjacently arranged on the electrical circuit board and comprising a plug contact with a mating contact element, each of the electrical contact devices include:

a first electrical contact portion mechanically fixing and electrically connecting the electrical contact device to the electrical circuit board by press-fitting;

a second electrical contact portion forming an electrical plug contact matable with an electrical mating contact element, the second electrical contact portion has a fork structure with a pair of fork elements mechanically clamping and fixing the electrical mating contact element on the electrical contact device; and a spring portion arranged between the first and second electrical contact portions in a longitudinal direction of the electrical contact device, the spring portion electrically connects the first and second contact portions, the spring portion permits an elastic variation of a spacing between the first and second electrical contact portions in the longitudinal direction.

19. The electrical contact system of claim 18, wherein the mating contact element is configured as a tab and clamped between the pair of fork elements of the fork structure of the second contact portion.

20. The electrical contact system of claim 18, wherein the spring portion has a pair of curved elements arranged opposite one another on two opposing edges of each of the pair of electrical contact devices.

21. The electrical contact system of claim 18, wherein the first electrical contact portion includes a fixing opening and a pair of latching teeth on opposing edges of each of the pair of electrical contact devices.

22. An electrical contact device, comprising:

a first electrical contact portion mechanically fixing and electrically connecting the electrical contact device to a circuit board by press-fitting;

a second electrical contact portion forming an electrical plug contact matable with an electrical mating contact element, the second electrical contact portion has a fork structure with a pair of fork elements mechanically clamping and fixing the electrical mating contact element on the electrical contact device; and a spring portion arranged between the first and second electrical contact portions in a longitudinal direction of the electrical contact device, the spring portion electrically connects the first and second contact portions, the spring portion permits an elastic variation of a spacing between the first and second electrical contact portions in the longitudinal direction, the spring portion including:

a first base portion contacting the first electrical contact portion;

a second base portion contacting the second electrical contact portion, the first base portion and the second base portion each have a contact element respectively protruding from the first base portion and the second base portion; and a curved element with a first curved portion, the curved element is connected to the first base portion and the second base portion and the first curved portion is contacted by the contact element.

* * * * *